US011941993B2

(12) United States Patent
Agarwal

(10) Patent No.: US 11,941,993 B2
(45) Date of Patent: Mar. 26, 2024

(54) SYSTEMS AND METHODS FOR PRESENTING MESSAGES TO FLIGHT CREW

(71) Applicant: HONEYWELL INTERNATIONAL INC., Charlotte, NC (US)

(72) Inventor: Jitender Kumar Agarwal, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 273 days.

(21) Appl. No.: 17/447,307

(22) Filed: Sep. 10, 2021

(65) Prior Publication Data
US 2023/0035950 A1 Feb. 2, 2023

(30) Foreign Application Priority Data
Jul. 28, 2021 (IN) .............................. 202111033864

(51) Int. Cl.
*G08G 5/00* (2006.01)
*G06F 3/0482* (2013.01)

(52) U.S. Cl.
CPC .......... *G08G 5/0021* (2013.01); *G06F 3/0482* (2013.01); *G08G 5/0008* (2013.01)

(58) Field of Classification Search
CPC ... G08G 5/0021; G08G 5/0008; G06F 3/0482
See application file for complete search history.

(56) References Cited

U.S. PATENT DOCUMENTS

| 9,262,927 B2 | 2/2016 | Populus et al. |
| 10,847,145 B2 | 11/2020 | Lafon et al. |
| 2008/0195309 A1 | 8/2008 | Prinzel, III et al. |
| 2013/0093612 A1 | 4/2013 | Pschierer et al. |
| 2014/0122070 A1 | 5/2014 | Prus et al. |
| 2017/0287467 A1* | 10/2017 | Lafon ................. G08G 5/0021 |
| 2019/0339928 A1 | 11/2019 | Lafon et al. |
| 2020/0027449 A1 | 1/2020 | Afon et al. |
| 2020/0372916 A1 | 11/2020 | Delpech |
| 2021/0065120 A1* | 3/2021 | De Munck ............ H04L 63/105 |

FOREIGN PATENT DOCUMENTS

WO   WO-2017161386 A1 *  9/2017  ........... B64C 39/024

* cited by examiner

*Primary Examiner* — Nabil H Syed
*Assistant Examiner* — Cal J Eustaquio
(74) *Attorney, Agent, or Firm* — Lorenz & Kopf LLP

(57) ABSTRACT

A transcription system for an aircraft is configured to: generate an ownship call sign list that includes a plurality of potential ownship call signs that may be used in messages from ATC directed to the ownship, categorize a received message as being directed to the ownship when a recovered call sign from the message corresponds to a call sign from the ownship call sign list; and signal an aircraft display device to display a graphical message element that is representative of the received message, includes a textual representation of message content and the recovered call sign from the received message, and that is displayed in a manner that indicates whether the received message has been categorized as being directed to the ownship or traffic aircraft. The transcription system for an aircraft may be configured to re-categorize a previously categorized received ATC message based on flight crew interaction with a GUI.

20 Claims, 9 Drawing Sheets

SYSTEMS AND METHODS FOR PRESENTING MESSAGES TO FLIGHT CREW

CROSS REFERENCE TO RELATED APPLICATION

This application claims priority to India Provisional Patent Application No. 202111033864, filed Jul. 28, 20211, the entire content of which is incorporated by reference herein.

TECHNICAL FIELD

Embodiments of the subject matter described herein relate generally to communicating with a flight crew member in aerial vehicles. More particularly, embodiments of the subject matter relate to presenting selected messages to a flight crew member during flight.

BACKGROUND

A transcription system can transcribe over-the-air voice communications between an air traffic controller (ATC) and a flight crew member such as a pilot. Over-the-air communications may include both ownship communications and traffic communications. The combination of the ownship communications and traffic communications can provide a flight crew member with a complete picture of all flying aircrafts in an airspace.

Call signs (CS) are used in aviation communication and are assigned as unique identifiers to aircraft. There are a lot of potential CS variations that an ATC may use for communicating with aircraft. To determine whether an over-the-air communication is directed to an ownship or to a traffic aircraft requires identifying whether a CS in the communication applies to the ownship or the traffic aircraft. Because of the number of potential CS variations that may be used, classifying a communication as an ownship communication versus a traffic communication can be complicated. Also, if a transcription system were to provide a display of a transcribed over-the-air voice communication to a pilot, the pilot would need to determine whether the transcribed communication were directed to the ownship or a traffic aircraft, which can be complicated.

Hence, it is desirable to provide systems and methods allowing a transcription system to properly classify an over-the-air communication as an ownship communication versus a traffic communication. Furthermore, other desirable features and characteristics of the present disclosure will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a transcription system for an aircraft is disclosed. The transcription system includes a controller. The controller is configured to: generate an ownship call sign list that includes a plurality of potential ownship call signs that may be used in messages from ATC directed to the ownship, the plurality of potential ownship call signs including one or more flight crew inputted call signs and a plurality of processor-generated call signs based on variations from flight crew inputted call sign information; add a plurality of additional processor-generated call signs to the ownship call sign list that are derived from an actual call sign used by ATC in a message directed to the ownship; and categorize a received message from ATC as being directed to the ownship when a recovered call sign from the message corresponds to a call sign from the ownship call sign list, wherein the recovered call sign corresponds to: a call sign from the plurality of processor-generated call signs based on variations from flight crew inputted call sign information, or a call sign from the plurality of additional processor-generated call signs. The controller is further configured to signal an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

In another embodiment, a method for a transcription system for an aircraft is disclosed. The method includes: generating an ownship call sign list that includes a plurality of potential ownship call signs that may be used in messages from ATC directed to the ownship, the plurality of potential ownship call signs including one or more flight crew inputted call signs and a plurality of processor-generated call signs based on variations from flight crew inputted call sign information; adding a plurality of additional processor-generated call signs to the ownship call sign list that are derived from an actual call sign used by ATC in a message directed to the ownship; and categorizing a received message from ATC as being directed to the ownship when a recovered call sign from the message corresponds to a call sign from the ownship call sign list, wherein the recovered call sign corresponds to: a call sign from the plurality of processor-generated call signs based on variations from flight crew inputted call sign information, or a call sign from the plurality of additional processor-generated call signs. The method further includes signaling an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

In another embodiment, a non-transitory computer readable medium is disclosed. The non-transitory computer readable medium is encoded with instructions that when executed by a controller for a transcription system for an aircraft is configurable to cause the transcription system to perform a method. The method includes: generating an ownship call sign list that includes a plurality of potential ownship call signs that may be used in messages from ATC directed to the ownship, the plurality of potential ownship call signs including one or more flight crew inputted call signs and a plurality of processor-generated call signs based on variations from flight crew inputted call sign information; adding a plurality of additional processor-generated call signs to the ownship call sign list that are derived from an actual call sign used by ATC in a message directed to the ownship; and categorizing a received message from ATC as being directed to the ownship when a recovered call sign from the message corresponds to a call sign from the ownship call sign list, wherein the recovered call sign corresponds to: a call sign from the plurality of processor-generated call signs based on variations from flight crew inputted call sign information, or a call sign from the plurality of additional processor-generated call signs. The method further includes signaling an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

In another embodiment, a transcription system for an aircraft is disclosed. The transcription system includes a controller. The controller is configured to: generate, for each of a plurality of received ATC messages, a corresponding graphical message element that includes a textual representation of message content (e.g., transcribed text or text from a CPDLC message) for a corresponding received ATC message; extract, for each of the plurality of received ATC messages, a call sign when a call sign can be extracted; generate a first graphical user interface (GUI) for display on an aircraft display device for displaying each of the graphical message elements in one of a plurality of visually distinguishable ways to distinguish categories of received ATC messages; categorize each of the plurality of received ATC messages as unrecognized, an ownship message, or a traffic message and cause the corresponding graphical message element to be displayed in one of a plurality of visually distinguishable ways based on how the corresponding message is categorized; signal the aircraft display device to display the GUI with the categorized graphical message elements; and re-categorize a previously categorized received ATC message based on flight crew interaction with the GUI.

In another embodiment, a method for a transcription system for an aircraft is disclosed. The method includes: generating, for each of a plurality of received ATC messages, a corresponding graphical message element that includes a textual representation of message content (e.g., transcribed text or text from a CPDLC message) for a corresponding received ATC message; extracting, for each of the plurality of received ATC messages, a call sign when a call sign can be extracted; generating a first graphical user interface (GUI) for display on an aircraft display device for displaying each of the graphical message elements in one of a plurality of visually distinguishable ways to distinguish categories of received ATC messages; categorizing each of the plurality of received ATC messages as unrecognized, an ownship message, or a traffic message and cause the corresponding graphical message element to be displayed in one of a plurality of visually distinguishable ways based on how the corresponding message is categorized; signaling the aircraft display device to display the GUI with the categorized graphical message elements; and re-categorizing a previously categorized received ATC message based on flight crew interaction with the GUI.

In another embodiment, a non-transitory computer readable medium is disclosed. The non-transitory computer readable medium is encoded with instructions that when executed by a controller for a transcription system for an aircraft is configurable to cause the transcription system to perform a method. The method includes: generating, for each of a plurality of received ATC messages, a corresponding graphical message element that includes a textual representation of message content (e.g., transcribed text or text from a CPDLC message) for a corresponding received ATC message; extracting, for each of the plurality of received ATC messages, a call sign when a call sign can be extracted; generating a first graphical user interface (GUI) for display on an aircraft display device for displaying each of the graphical message elements in one of a plurality of visually distinguishable ways to distinguish categories of received ATC messages; categorizing each of the plurality of received ATC messages as unrecognized, an ownship message, or a traffic message and cause the corresponding graphical message element to be displayed in one of a plurality of visually distinguishable ways based on how the corresponding message is categorized; signaling the aircraft display device to display the GUI with the categorized graphical message elements; and re-categorizing a previously categorized received ATC message based on flight crew interaction with the GUI.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
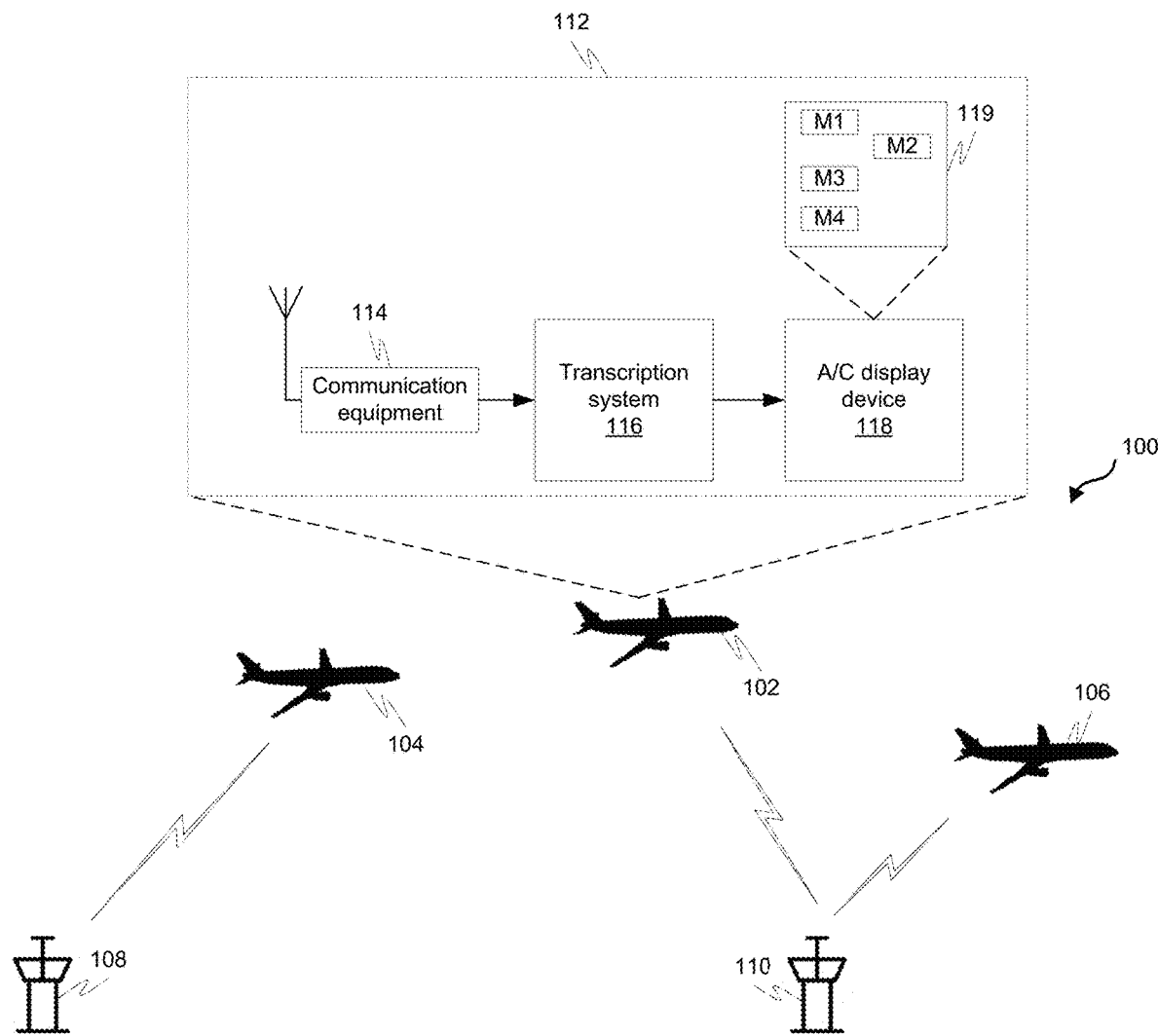
FIG. 1 is a block diagram depicting an example flight environment such as one around a busy aerodrome, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module"

refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

A transcription system can transcribe over-the-air voice communications between air traffic control personnel at a flight operation center (FOC), such as an air traffic controller (ATC), and a flight crew member such as a pilot. Over-the-air communications may include both ownship communications and traffic communications. Ownship communications may include commands from an ATC to an ownship pilot for the pilot to act on. The ownship communications may also include traffic alerts that are communicated to an ownship pilot. Traffic communication may include commands for traffic pilots. Knowledge of the traffic communications can provide situational awareness to an ownship pilot. Distinguishing ownship communications from traffic communications can increase pilot workload.

The subject matter described herein discloses apparatus, systems, techniques, and articles for automatically distinguishing ownship communications from traffic communications and for visually presenting transcriptions of over-the-air communications in a manner that makes it easy for a flight crew member to distinguish between ownship communications and traffic communications.

FIG. 1 is a block diagram depicting an example flight environment 100 such as one around a busy aerodrome. The example environment 100 includes a plurality of aerial vehicles (ownship aircraft 102 and traffic aircraft 104, 106 in this example), but could include a variety of types of aerial vehicles such as helicopters, UAVs (unmanned aerial vehicles), and others. The example environment 100 also includes a plurality of flight operation centers (FOCs) (e.g., air traffic control towers 108, 110) containing control personnel such as air traffic controllers (ATC) for directing ground and air traffic in the vicinity of the aerodrome.

The example ownship aircraft 102 includes avionics equipment 112 that receives the ongoing communications between the aerial vehicles (e.g., 102, 104, 106) and ATC (e.g., via towers 108, 110) using communication equipment 114, and presents the ongoing communications as a continuous stream of audio to a transcription system 116. The transcription system 116 decodes the continuous stream of audio, generates formatted text from the decoded continuous stream of audio, and signals an aircraft (A/C) display device 118 to display the generated formatted text for viewing by the flight crew onboard the ownship aircraft 102. The aircraft display device 118 may be one of many types of graphical display units onboard an aircraft such as a navigation display, a PFD (primary flight display), a PED (personal electronic device), an EFB (electronic flight bag), HUD (heads up display), HDD (heads down display), and others. The display of the formatted text may be made via a graphical display page 119 that displays each generated textual message (M1, M2, M3, M4, . . . ) in a manner that visually identifies which messages are directed to the ownship aircraft and which messages are directed to a traffic aircraft.

Figure 2:
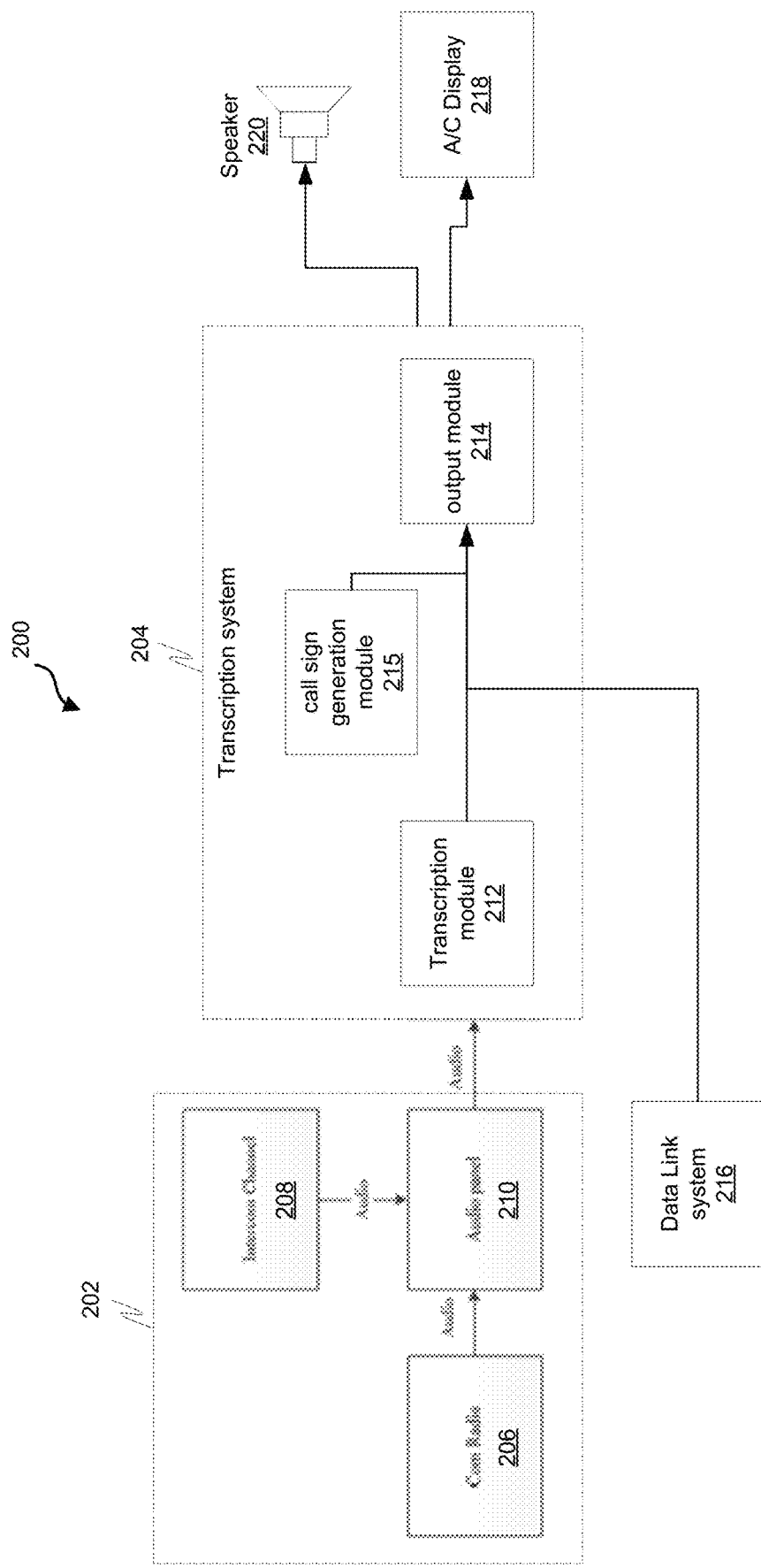
FIG. 2 is a block diagram depicting example avionics equipment, in accordance with some embodiments.

FIG. 2 is a block diagram depicting example avionics equipment 200. The example avionics equipment 200 includes communication equipment 202 and an example transcription system 204 for receiving ongoing over-the-air communications and generating formatted text from the over-the-air communications for display onboard an aerial vehicle. The example communication equipment 202 includes a Com radio 206 (such as that known in the art) and an intercom channel 208 (such as that known in the art) for receiving over-the-air communications between various aerial vehicles (ownship and traffic aerial vehicles) and ATC. The example communication equipment 202 also includes an audio panel 210 (such as that known in the art) for accumulating the over-the-air communications from various sources and outputting the audio from the over-the-air communications.

The example transcription system 204 is configured to receive audio communications from or directed to a flight operating center (FOC) (e.g., an ATC center or some other FOC) via the communication equipment 202 (e.g., via audio panel 210), extract message content from the received audio communications, generate formatted text from the extracted message content, and display the formatted text from the received voice communications onboard the aerial vehicle. The example transcription system 204 is also configured to receive data link communications (DLC) (e.g., CPDLC (controller pilot data link communication)) from or to an FOC (such as ATC) via a data link system 216, extract message content from the DLC, generate formatted text from the extracted message content, and display the formatted text from the received DLC communications onboard the aerial vehicle. The example transcription system 204 includes a transcription module 212 for extracting message content and a call sign from the received audio communications and the DLC, and an output module 214 for generating formatted text from the extracted message content and call sign, generating graphics for displaying the formatted text, and signaling an aircraft display 218 to display the generated graphics onboard the aerial vehicle. The example transcription system 204 further includes a call sign generation module 215 for generating an ownship call sign list and a traffic call sign list, which can be used to classify received messages as being directed to the ownship or traffic aircraft.

Each of the transcription module 212, the output module 214, and the call sign generation module 215 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example transcription module 212 is configured to retrieve message content from a plurality of received messages. The plurality of received messages may include a plurality of CPDLC messages and a plurality of voice messages. The example transcription module 212 is configured to transcribe message content from the plurality of received voice messages to text. The example transcription module 212 is also configured to extract message content from the plurality of received CPDLC messages as text.

The example transcription module 212 is configured to decode the audio from the voice messages using speech recognition techniques to convert the audio into text. The speech recognition techniques may be implemented using machine learning techniques such as deep neural networks, statistical techniques, rule-based systems, and others. The example transcription module 212 may use various techniques such as NLP to convert the text from the audio and/or DLC to formatted text.

The example output module 214 is configured to generate a graphical message element for each of the plurality of received messages that includes a section for displaying a textual representation of the message content for a corresponding received message and a call sign section for displaying an extracted call sign for the aircraft (e.g., ownship or traffic aircraft) to which the received message is directed. The example output module 214 is configured to parse the received message to extract the message content and the recovered call sign.

The message content and recovered call sign for a corresponding received message may include message content and a recovered call sign from a CPDLC message or transcribed message content and recovered call sign from a voice message. The graphical message elements for each of the plurality of received messages may include graphical message elements having message content and a recovered call sign from a CPDLC message and graphical message elements having transcribed message content and a recovered call sign from a voice message.

In one example implementation, the example transcription system 204 is configured to retrieve a plurality of received messages originating from one or more entities outside of the aircraft; extract a call sign from each of the plurality of retrieved messages; generate a graphical message element associated with a retrieved message for each of the plurality of retrieved messages that includes a section for displaying message content extracted from the received message and an extracted call sign for an intended recipient of the associated message; and signal an aircraft display device to display the graphical message elements for each of the plurality of retrieved messages in a manner that indicates whether a retrieved message corresponding to a graphical message element is categorized as a traffic message or an ownship message.

The example call sign generation module 215 is configured to generate an ownship call sign list that includes a plurality of potential ownship call signs that may be used in messages from ATC directed to the ownship and a traffic call sign list for traffic call signs that may be used in messages from ATC directed to traffic aircraft in an area near where the ownship will fly. The ownship call sign list and traffic call sign list may be used in the example transcription system 204 to categorize a retrieved message as a traffic message or an ownship message.

The example output module 214 is configured to categorize a received message from ATC as being directed to a traffic aircraft when a recovered call sign from the message corresponds to a call sign from the traffic call sign list. The example output module 214 is configured to categorize a received message from ATC as being directed to the ownship when a recovered call sign from the message does not correspond to a call sign from the traffic call sign list, but instead corresponds to a call sign from the ownship call sign list.

The example call sign generation module 215 is configured to generate the ownship call sign list by adding one or more flight crew inputted call signs and a plurality of processor-generated call signs that are generated by the example call sign generation module 215 based on variations from flight crew inputted call sign information. The example call sign generation module 215 is configured to generate and cause to be displayed a call sign entry GUI from which a flight crew member may enter potential call signs that may be used to identify the ownship and call sign information from which potential call signs for the ownship may be derived.

Figure 3:
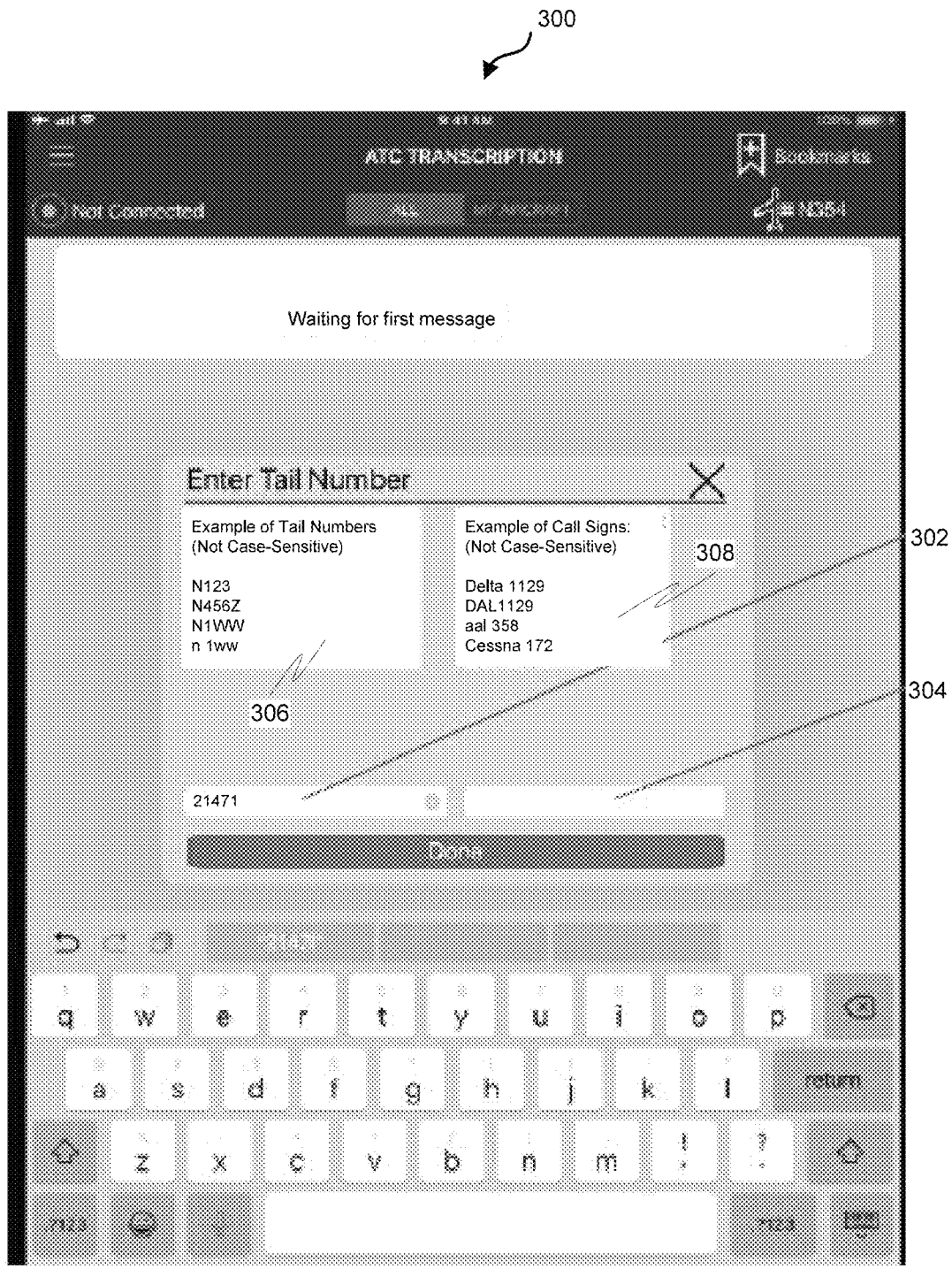
FIG. 3 is a diagram depicting an example GUI that may be used by the example call sign generation module to receive the input of a potential ownship call sign, an ownship tail number, a flight ID, and/or additional flight crew inputted call sign information, in accordance with some embodiments.

FIG. 3 is a diagram depicting an example GUI 300 that may be used by the example call sign generation module 215 to receive the input of a potential ownship call sign, an ownship tail number, a flight ID, and/or additional flight crew inputted call sign information. The example GUI 300 includes a first field 302 in which a flight crew member could use to enter a potential ownship call sign, an ownship tail number or a flight ID, and a second field 304 in which a flight crew member could use to enter additional flight crew inputted call sign information. The additional flight crew inputted call sign information may include one or more flight crew inputted call sign keywords comprising one or more of aircraft manufacturer name and brand name, special designator assigned to aircraft, and aircraft category. The example GUI 300 also includes an example tail number box 306 for providing examples of a tail number that may be entered and an example call sign box 308 for providing examples of a call sign that may be entered. Based on flight crew inputted information (e.g., in the first field 302 and the second field 304), the example call sign generation module 215 is configured to generate the ownship call sign list by adding one or more flight crew inputted call signs and a plurality of processor-generated call signs. The call sign generation module 215 is configured to make the entry fields (e.g., the first field 302 and the second field 304) available to the flight crew at initialization of the transcription system and also throughout a flight for modification or even addition of new keywords when deemed desirable or necessary by the flight crew.

The call sign generation module 215 is configured to generate the call sign list by adding flight crew inputted call sign(s) (e.g., from the first field 302) to an ownship call sign list, expanding the flight crew entered call sign(s) using the additional flight crew inputted information (e.g., from the second field 304), and adding the expanded call signs to the ownship call sign list. The call sign generation module 215 is configured to perform the expansion in accordance with established guidelines (such as International Civil Aviation Organization (ICAO) established guidelines) that define some basic rules for call signs.

The call sign generation module 215 is further configured to perform airline code conversions to a shorter call sign. Information for airline code conversions to a shorter call sign can be stored in database accessed by the call sign generation module 215 to generate call signs when an airline code is detected in flight crew inputted information, e.g., in the first field 302. In non-limiting examples, the call sign generation module 215 may convert an airline code to a shorter call sign as follows: LUFTHANSA→HANSA; SCANDINAVIAN→SCAN; SCANWING→SCAN; TRANSAVIA→AVIA; RYANAIR→RYAN; SPEEDBIRD-→BIRD The call sign generation module 215 is configured to expand the flight crew entered call sign(s) by deriving valid call sign variations from the flight crew entered call sign(s) (e.g., first level expansion). The call sign generation module 215 is also configured to expand the flight crew entered call sign(s) using the additional flight crew inputted information (e.g., from the second field 304) by providing valid combinations of a flight crew inputted call sign and an individual keyword from the additional flight crew inputted information (e.g., entered in the second field 304) (e.g., second level expansion) and by providing valid combinations of the derived valid call sign variations (from first level expansion) and an individual keyword from the additional flight crew inputted information (e.g., third level expansion). The call sign generation module 215 is configured to expand the call sign variations further by providing valid combinations of the derived call sign variations (from the second and third level expansion) and one or more additional keywords from the additional flight crew inputted information (e.g., fourth level expansion). The call sign generation module 215 is configured to expand the ownship call sign list further by using internal keywords such as November, experimental and test to combine with the generated combinations of ownship call signs (e.g., fifth level expansion).

Thus, the call sign generation module 215 may generate a plurality of processor-generated call signs based on variations from flight crew inputted call sign information. The processor-generated call signs based on variations from flight crew inputted call sign information may include a plurality of processor-generated call signs generated based on one or more of: one or more flight crew inputted call sign keywords, a tail number, a flight ID, one or more airline-specific shortened call sign variations, or a specific or special designator assigned to aircraft operators or companies or airlines.

In a non-limiting example, the pilot of ownship tail number N667HW may enter 667HW in the first field 302, and Boeing, Heavy, Honeywell, Honeywell Boeing, Honeywell Test in the second field 304. Based on these inputs, the example call sign generation module 215 is configured to generate a number of variations that are extracted from the input data and added to an ownship call sign list for call sign recognition. Example call signs generated based on the first field 302 values may include: November six six seven hotel whiskey (covers the call sign N667HW); Six six seven hotel whiskey; Sixty six seven hotel whisky; Six sixty seven hotel whiskey; Six six seven; Sixty six seven; Six sixty seven; Six seven hotel whiskey; sixty seven hotel whiskey; Seven hotel whiskey; Experimental November six six seven hotel whiskey; Experimental six six seven hotel whiskey; Experimental six six seven; Experimental six seven hotel whiskey; and Experimental seven hotel whiskey Example call sign combinations generated based on second field 304 keywords and existing call signs in the ownship call sign list may include: Boeing November six six seven hotel whiskey; Boeing six six seven hotel whiskey; Boeing six six seven; Boeing six seven hotel whiskey; Boeing seven hotel whiskey; Experimental Boeing November six six seven hotel whiskey; Experimental Boeing six six seven hotel whiskey; Experimental Boeing six six seven; Experimental Boeing six seven hotel whiskey; Experimental Boeing seven hotel whiskey; Heavy November six six seven hotel whiskey; Heavy six six seven hotel whiskey; Heavy six six seven; Heavy six seven hotel whiskey; Heavy seven hotel whiskey; Experimental heavy November six six seven hotel whiskey; Experimental heavy six six seven hotel whiskey; Experimental heavy six six seven; Experimental heavy six seven hotel whiskey; Experimental heavy seven hotel whiskey; Boeing heavy November six six seven hotel whiskey; Boeing heavy six six seven hotel whiskey; Boeing heavy six six seven; Boeing heavy six seven hotel whiskey; Boeing heavy seven hotel whiskey; Honeywell Boeing heavy November six six seven hotel whiskey; Honeywell Boeing heavy six six seven hotel whiskey; Honeywell Boeing heavy six six seven; Honeywell Boeing heavy six seven hotel whiskey; Honeywell Boeing heavy seven hotel whiskey; Honeywell heavy November six six seven hotel whiskey; Honeywell heavy six six seven hotel whiskey; Honeywell heavy six six seven; Honeywell heavy six seven hotel whiskey; Honeywell heavy seven hotel whiskey; Honeywell Boeing November six six seven hotel whiskey; Honeywell Boeing six six seven hotel whiskey; Honeywell Boeing six six seven; Honeywell Boeing six seven hotel whiskey; Honeywell Boeing seven hotel whiskey; Honeywell Boeing (separate call sign derived from the second field 304 based on delimiter ":"); and Honeywell Test (separate call sign derived from the second field 304 based on delimiter ":")

The call sign generation module 215 is also configured to generate and add a plurality of new call sign variations at runtime to the ownship call sign list based on flight crew identification of an actual call sign in a received message being used to identify the ownship. For example, ATC may change an ownship call sign based on ambiguity with a similarly sounding or similar call sign for a traffic aircraft in the vicinity. The new call sign may be totally different from the earlier assigned one. The call sign generation module 215 is configured to allow the flight crew to enter new or change call sign information during flight. In a non-limiting example, during flight, the flight crew can open the call sign entry form (e.g., GUI 300) with fields 302 and 304 pre-filled with existing data (e.g., data entered during initialization). The flight crew has the option to edit the existing data or remove the existing data entirely and enter new data. When the flight crew has completely removed the pre-filled data and re-filled fields 302 and 304 with new data, the call sign generation module 215 is configured to log and invalidate the prior ownship call sign list and re-generate a new ownship call sign list based on the entry of the new data. When the flight crew has not completely removed the pre-filled data and for each new word entry, the call sign generation module 215 is configured to auto generate new call sign variations and append the new call sign variations to the existing ownship call sign list. When the flight crew has not completely removed the pre-filled data and for each deletion of older data or keyword, the call sign generation module 215 is configured to initiate the removal of any corresponding call signs and call sign variations from the existing ownship call sign list. When the flight crew has not completely removed the pre-filled data and for any update to older call sign data, the call sign generation module 215 is configured to change only the corresponding entries in the existing ownship call sign list that have been impacted. In each of these examples, the call sign generation module 215 is configured to log and invalidate the previous ownship call sign list data, and generate a new ownship call sign list based on flight crew input.

The call sign generation module 215 is configured to add the actual call sign to the ownship call sign list, generate new call sign variations based on the actual call sign, and add the generated new call sign variations to the ownship call sign list. The call sign generation module 215 is configured to generate the new call sign variations based on one or more flight crew inputted call sign keywords, a tail number, a flight ID, one or more airline-specific shortened call sign variations, or a specific or special designator assigned to aircraft operators or companies or airlines. Thus, the plurality of potential ownship call signs may also include a plurality of additional processor-generated call signs that are generated by the call sign generation module 215, derived from an actual call sign used by ATC in a message directed to the ownship, and added by the call sign generation module 215 to the ownship call sign list.

The call sign generation module 215 is also configured to allow the flight crew to delete an existing ownship call sign list, regenerate call sign variations based on dynamic input, or add new variations based on dynamic input to an existing ownship call sign list.

The call sign generation module 215 is also configured to sort the ownship call sign list, push shorter combinations and call signs in compliance with ICAO guidelines to the top of list, and push bigger and non-complied call signs to the bottom of the list. This may allow for quicker classification of ATC messages as ownship messages if a binary sort is used for classification.

The example call sign generation module 215 is also configured to store a generated call sign list along with flight crew inputted call sign and flight route information to allow the generated call sign list to be reused if the same call sign and flight route information is entered in the future.

The example call sign generation module 215 is also configured to apply rules to check the correctness and adherence of flight crew inputted call signs the governing guidelines, such as ICAO guidelines. The example call sign generation module 215 is configured to alert a flight crew member of mismatch or non-compliance during call sign entry. This can alert the flight crew to potential typographical errors when inputting data. The example call sign generation module 215 may allow the flight crew to override the alert the flight crew inputted data to be used.

The call sign generation module 215 is also configured to generate a traffic call sign list comprising a plurality of traffic call signs for traffic aircraft. The call sign generation module 215 is configured to generate the traffic call sign list based on data received from an external source, such as Automatic Dependent Surveillance-Broadcast (ADS-B), Flight Information System Broadcast (FIS-B), and other contextual data.

Figure 4:
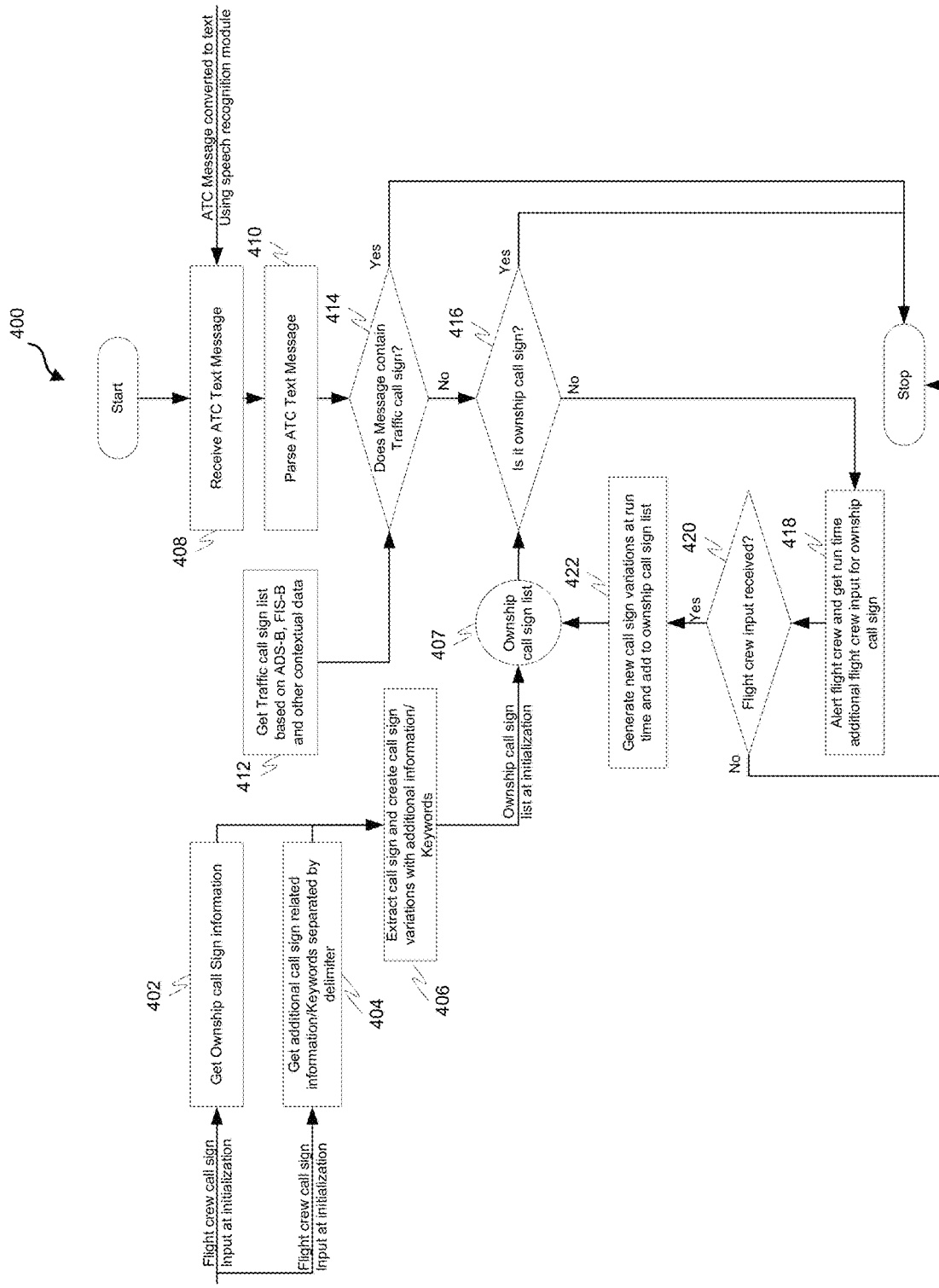
FIG. 4 is a process flow chart depicting an example process in a transcription system, in accordance with some embodiments.

FIG. 4 is a process flow chart depicting an example process 400 in a transcription system. The order of operation within the process 400 is not limited to the sequential execution as illustrated in the figure but may be performed in one or more varying orders as applicable and in accordance with the present disclosure.

The example process 400 includes obtaining ownship call sign information from flight crew (operation 402) and obtaining keywords containing additional call sign information (operation 404). This information may be obtained when the transcription system is initialized.

The example process 400 includes extracting flight crew inputted call signs and generating call sign variations using the keywords (operation 406). This results in an ownship call sign list 407 being generated. The example process 400 includes generating a traffic call sign list (operation 412). The traffic call sign list may be generated based, for example, on ADS-B, FIS-B, and other contextual data.

The example process 400 includes receiving an ATC message (operation 408) and parsing the ATC message (operation 410) to identify the call sign embedded in the ATC message.

The example process 400 includes determining if the ATC message contains a Traffic call sign (decision 414). If the ATC message contains a Traffic call sign (yes at decision 414), then it is known that the ATC message is a message for a traffic aircraft. The ATC message may be classified as a Traffic message.

If the ATC message does not contain a Traffic call sign (no at decision 414), then the example process 400 includes determining if the ATC message contains an ownship call sign from the ownship call sign list (decision 416). If the ATC message contains an ownship call sign from the ownship call sign list (yes at decision 416), then it is known that the ATC message is a message for the ownship aircraft. The ATC message may be classified as an ownship message.

If the ATC message does not contain an ownship call sign from the ownship call sign list (no at decision 416), then the example process 400 includes alerting the flight crew and obtaining flight crew input (if any) during runtime regarding whether the call sign for the ATC message should be identified as an ownship call sign (operation 418) and determining if flight crew input has been received (decision 420). In a non-limiting example, the transcription system will display such message using visual cues to alert flight crew. The flight crew can review the message and either provide input to re-classify using swipe action or any other means or ignore the message. If there is no flight crew input, the transcription system does not do anything else to the message. If there is flight crew input, the transcription system can re-classify the message based on the flight crew input. The flight crew input may be made by a dynamic change in message classification via the arrows in the message or by a dynamic change made via a call sign entry in field 304 with a new keyword added with or without an edit to existing keywords or an update to field 302.

If flight crew input is not received or the flight crew indicates that the ATC message should not be an ownship message (no at decision 420), then the process 400 ends for the ATC message. If flight crew input is received and the flight crew indicates that the Message should be an ownship message (yes at decision 420), then the example process 400 includes generating new call sign variations at run time and adding the new call sign variations and the call sign identified by the flight crew as pertaining to the ownship to the ownship call sign list 407 (operation 422). These new call signs can be used for determining if future ATC messages are directed to the ownship.

The example output module 214 is configured to use an ownship call sign list and a traffic call sign list to categorize received messages originating from one or more entities outside of the aircraft as being directed to the ownship or as being directed to a traffic aircraft. The example output module 214 is configured to cause the graphical message elements associated with the categorized received messages to be displayed in a manner that visually indicates whether a graphical message element corresponds to a message directed to the ownship or corresponds to a message directed to a traffic aircraft.

Figure 5:
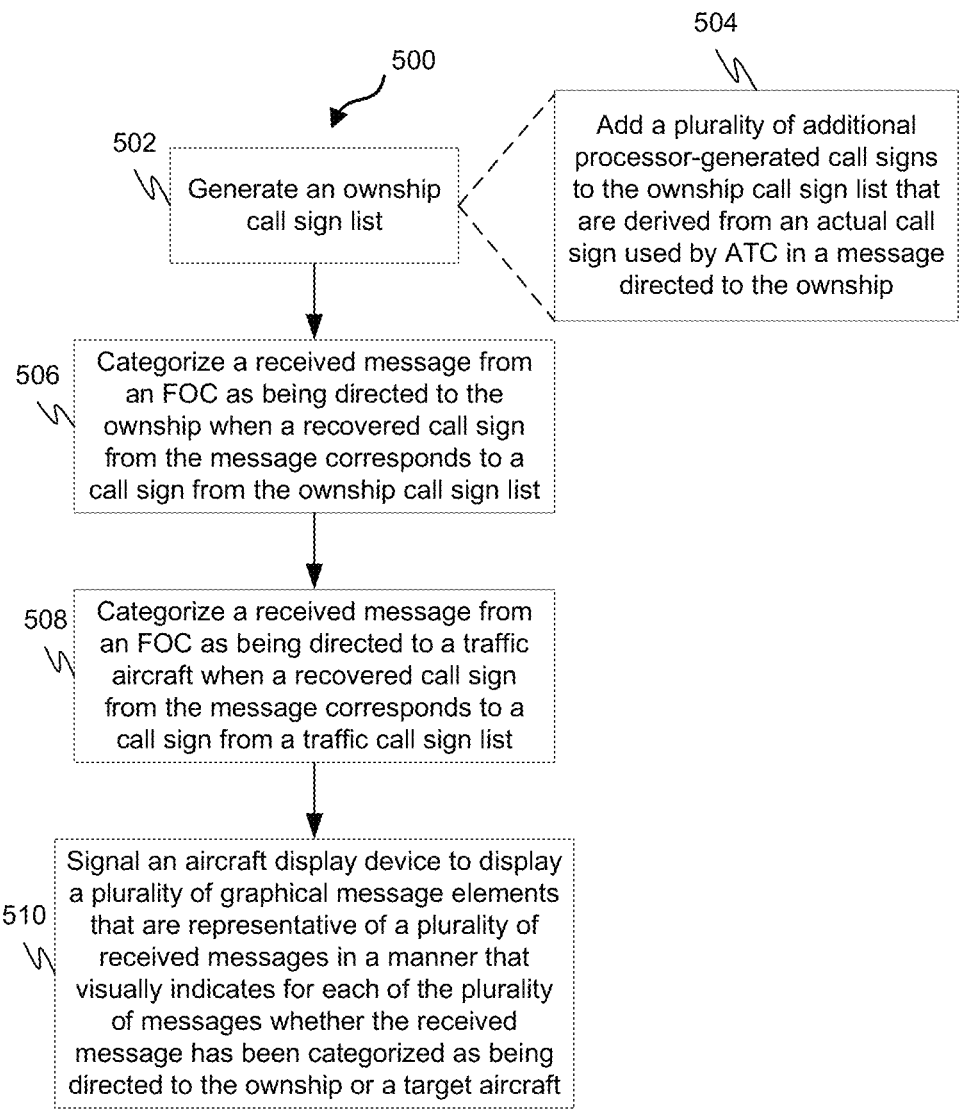
FIG. 5 is a process flow chart depicting an example process for displaying graphical message elements corresponding to received messages, in accordance with some embodiments.

FIG. 5 is a process flow chart depicting an example process 500 for displaying graphical message elements corresponding to received messages. The order of operation within the process 500 is not limited to the sequential execution as illustrated in the figure but may be performed in one or more varying orders as applicable and in accordance with the present disclosure.

The example process 500 includes generating an ownship call sign list (operation 502). The ownship call sign list includes a plurality of potential ownship call signs that may be used in messages from an FOC (such as ATC) directed to the ownship. The ownship call sign list may be generated from one or more flight crew inputted call signs and a plurality of processor-generated call signs that are generated based on variations from flight crew inputted call sign information. The generating an ownship call sign list may also include adding a plurality of additional processor-generated call signs to the ownship call sign list that are derived from an actual call sign used by ATC in a message directed to the ownship (operation 504). The additional processor-generated call signs that are derived from an actual call sign may be generated based on modifying the actual call sign using the flight crew inputted call sign information.

The example process 500 includes categorizing a received message from an FOC as being directed to the ownship when a recovered call sign from the message corresponds to a call sign from the ownship call sign list (operation 506). The recovered call sign may correspond to one or more of: a flight crew inputted call sign, a processor-generated call sign that was generated based on variations from flight crew inputted call sign information, an actual call sign, or a processor-generated call sign that was generated based on variations from an actual call sign and flight crew inputted call sign information.

The example process 500 includes categorizing a received message from an FOC as being directed to a traffic aircraft when a recovered call sign from the message corresponds to a call sign from a traffic call sign list (operation 508).

The example process 500 includes signaling an aircraft display device to display a plurality of graphical message elements that are representative of a plurality of received messages in a manner that visually indicates for each of the plurality of messages whether the received message has been categorized as being directed to the ownship or a traffic aircraft (operation 510). Each graphical message element includes a textual representation of message content and a recovered call sign from a received message.

Figure 6:
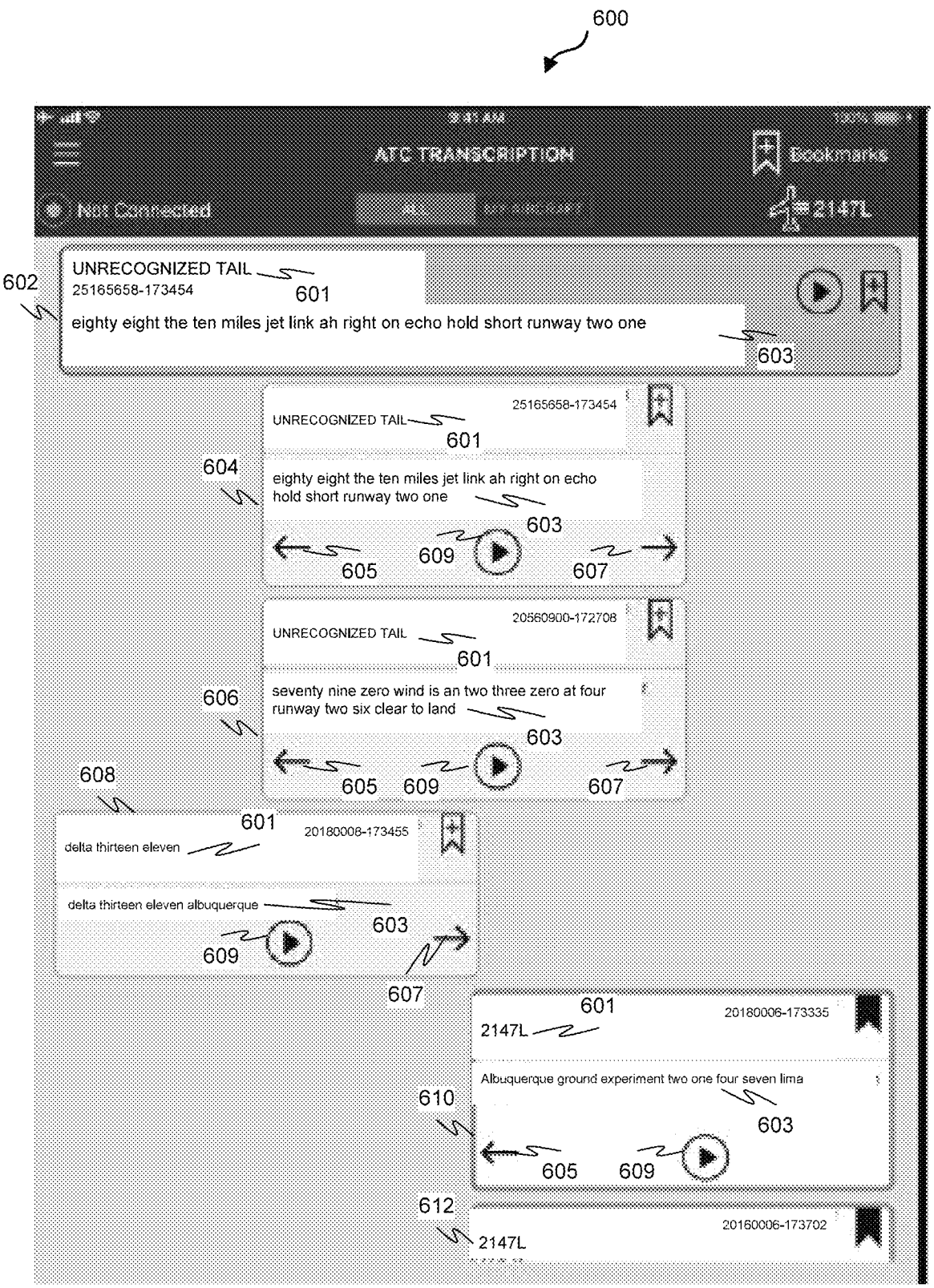
FIG. 6 is a diagram depicting an example GUI generated by the example output module for displaying graphical message elements, in accordance with some embodiments.

FIG. 6 is a diagram depicting an example GUI 600 generated by the example output module 214 for displaying graphical message elements. In addition to generating graphical message elements, the example output module 214 is configured to cause the generated graphical message elements to be displayed in a manner that visually indicates whether the graphical message element corresponds to a message directed to the ownship or corresponds to a message directed to a traffic aircraft. Depicted in the GUI 600 are a plurality of graphical message elements. The plurality of graphical message elements include a first uncategorized graphical message element 602 that corresponds to a received message in which a call sign could not be recovered, a second uncategorized graphical message element 604 that corresponds to a received message in which a recovered call sign is not included in either a traffic call sign list or an ownship call sign list, a third uncategorized graphical message element 606 that corresponds to another received message in which a recovered call sign is not included in either a traffic call sign list or an ownship call sign list, a first traffic graphical message element 608 that corresponds to a received message in which a recovered call sign is included in the traffic call sign list, a first ownship graphical message element 610 that corresponds to a received message in which a recovered call sign is included in the ownship call sign list, and a second ownship graphical message element 612 that corresponds to another received message in which a recovered call sign is included in the ownship call sign list. Each of the example graphical message elements 602, 604, 606, 608, 610, 612 includes a call sign section 601, a message content section 603, and a play message button 609 that when selected causes the message content to be aurally recited over a speaker or PA system in the aircraft. The traffic call sign list and/or the ownship call sign list may be generated by the call sign generation module 215 as described above or by some other module or methodology.

The example output module 214 is configured to cause the graphical message elements to be displayed in a manner that visually indicates for each of the plurality of corresponding messages whether the received message has been categorized as being directed to the ownship or a traffic aircraft. In this example, the output module 214 is configured to do so by placing the graphical message element in specific areas of the GUI 600. In particular, the example output module 214 is configured to do so by causing the graphical message elements representing messages that are categorized as ownship messages to be displayed in a right column of the GUI 600, causing the graphical message elements representing messages that are categorized as traffic messages to be displayed in a left column of the GUI 600, causing the graphical message elements representing messages wherein a call sign is recognized but the message cannot be categorized as a traffic message or an ownship message to be displayed in a center column of the GUI 600, and causing the graphical message elements representing messages wherein a call sign is not recognized to be displayed across all columns of the GUI 600.

The example output module 214 is configured to provide, for the graphical message elements, selectable category change graphical elements, depicted in this example as arrows, that when actuated by a user cause a graphical message element to move from one column of the GUI 600 to another, the corresponding message to be recategorized to a state that matches the column to which the graphical message element was moved, and also causes a change to the traffic call sign list and/or the ownship call sign list. The graphical message elements 604, 606 representing messages wherein a call sign is recognized but the message cannot be categorized as a traffic message or an ownship message include two category change graphical elements 605, 607, wherein selection of a first category change graphical element 605 causes the associated graphical message element to move from the uncategorized column to the traffic aircraft column and selection of a second category change graphical element 607 causes the associated graphical message element to move from the uncategorized column to the ownship column. The graphical message elements 608 representing a message categorized as a traffic message includes a second category change graphical elements 607, wherein selection of the second category change graphical element 607 causes the associated graphical message element to move from the traffic aircraft column to the uncategorized column. The graphical message elements 610 representing a message categorized as an ownship message includes a first category change graphical elements 605, wherein selection of the first category change graphical element 605 causes the associated graphical message element to move from the ownship column to the uncategorized column.

Figure 7A:
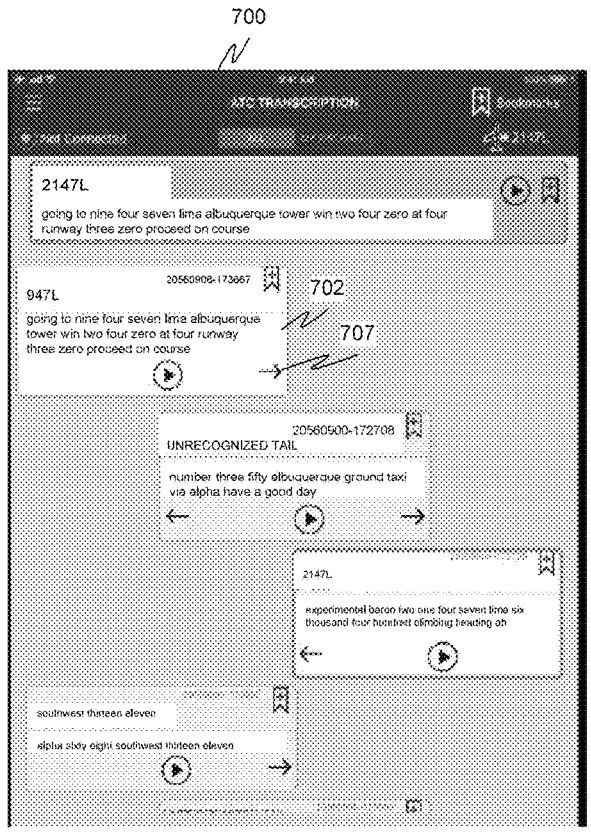
FIGS. 7A and 7B are diagrams depicting different states of an example GUI generated by the example output module for displaying graphical message elements, in accordance with some embodiments.
Figure 7B:
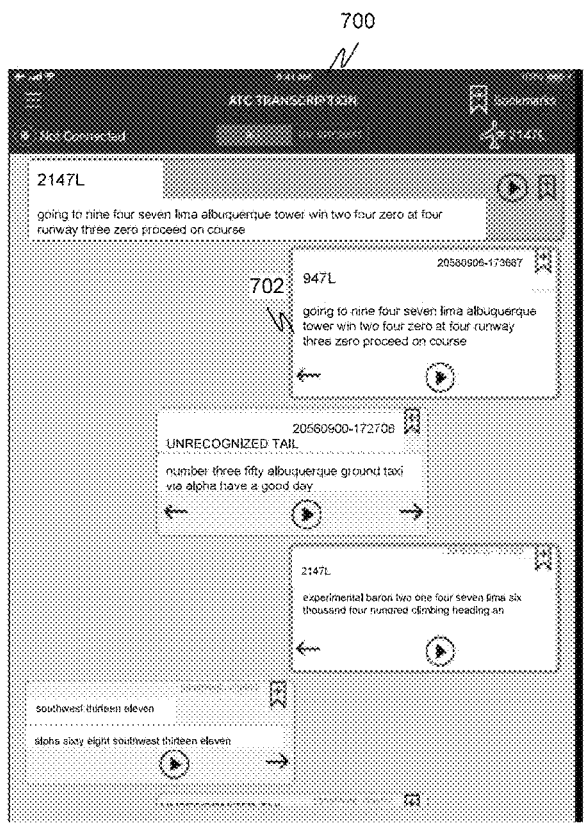

FIGS. 7A and 7B are diagrams depicting different states of an example GUI 700 generated by the example output module 214 for displaying graphical message elements. In the example of FIG. 7A, depicted in the GUI 700 is a plurality of graphical message elements. The plurality of graphical message elements include a graphical message element 702 that corresponds to a received message in which a recovered call sign is included in the traffic call sign list. In this example, the output module 214 has caused the graphical message element 702 to be placed in a left column of the GUI 700 representing a message that has been categorized as a traffic message.

In the example of FIG. 7B, depicted in the GUI 700 is the same plurality of graphical message elements as depicted in the example of FIG. 7A. In this example, the graphical message element 702 has been moved by the example output module 214 from the left column to the right column responsive to a user twice selecting a second category change graphical element 707 indicating a desire for the corresponding message to be categorized as an ownship message, the recovered call sign 947L to be removed from the traffic aircraft call sign list, and the recovered call sign 947L to be added to the ownship call sign list. Thus, future messages directed to call sign 947L will be classified as an ownship message instead of as a traffic aircraft message.

The examples of FIGS. 6, 7A, and 7B illustrate one type of flight crew interaction with the GUI utilized by the example output module 214 to cause the generated graphical message elements to move from one column to another. Alternatively, and/or additionally, the example output module 214 could cause the generated graphical message elements to move from one column to another in response to a user swipe action. Other methods of flight crew interaction with the GUI could be employed as well.

The examples of FIGS. 6, 7A, and 7B provide one way in which the example output module 214 could cause the generated graphical message elements to be displayed in a manner that visually indicates whether the graphical message element corresponds to a message directed to the ownship or corresponds to a message directed to a traffic aircraft. Other visual cues may be applied additionally or alternatively. For example, the graphical message elements could be displayed and/or outlined with a first color representing an ownship message, a second color representing a traffic aircraft message, and/or a third color representing an uncategorized message. Other visual cues may also be applied, including but not limited to changes in size and/or shape of the graphical message elements.

Figure 8:
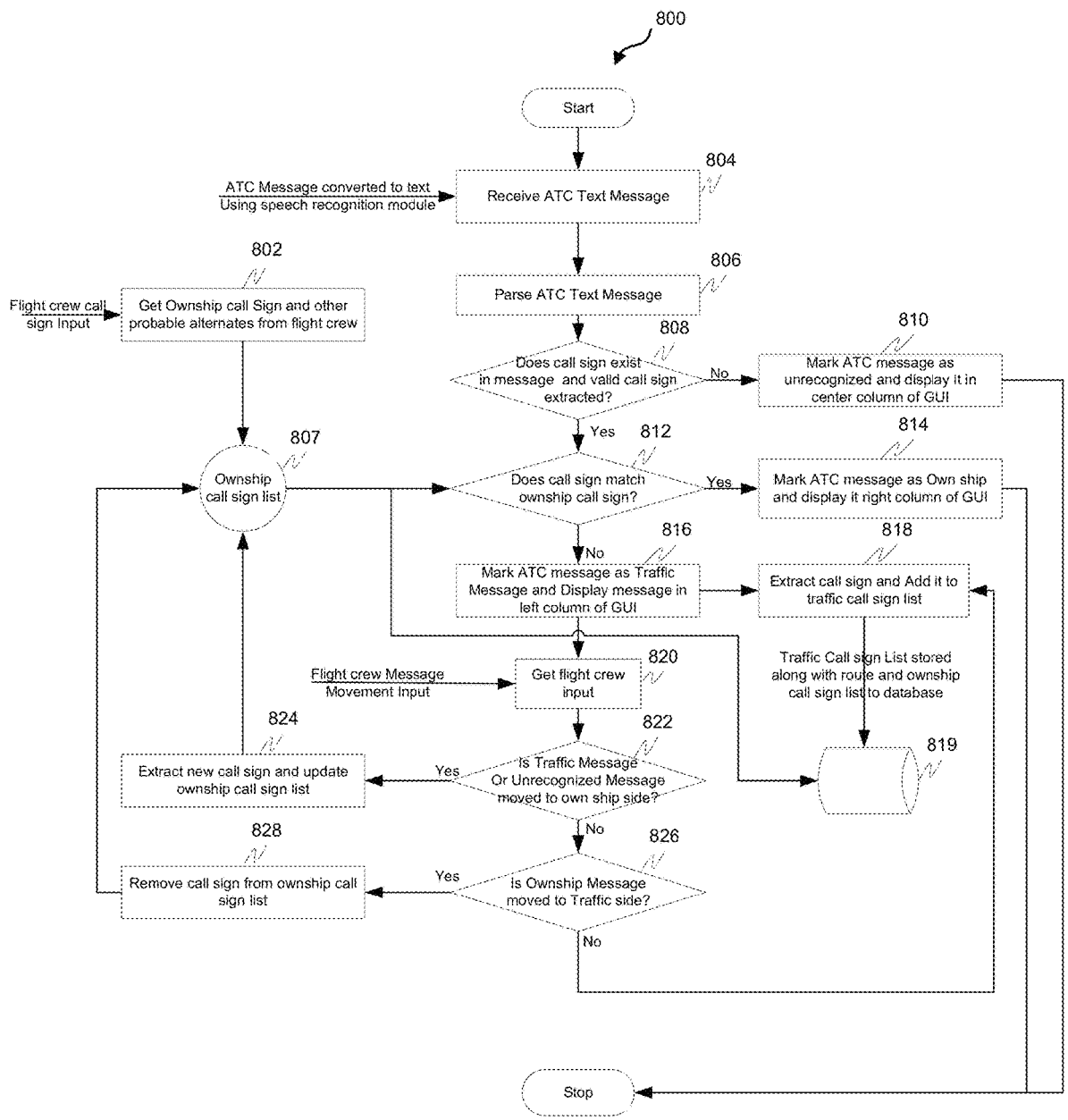
FIG. 8 is a process flow chart depicting an example process for distinguishing ownship communications from traffic communications, in accordance with some embodiments.

FIG. 8 is a process flow chart depicting an example process 800 for distinguishing ownship communications from traffic communications. The order of operation within the process 800 is not limited to the sequential execution as illustrated in the figure but may be performed in one or more varying orders as applicable and in accordance with the present disclosure.

The example process 800 includes obtaining an ownship call sign and other probable alternates from the flight crew (operation 802). The ownship call sign and other probable alternates are used to generate an ownship call sign list 803.

The example process 800 includes receiving an ATC message (operation 804) and parsing the received ATC message (operation 806). The ATC message is parsed to identify whether a call sign is contained therein.

The example process 800 includes determining whether a call sign exists in the ATC message and whether a valid call sign can be extracted (decision 808). If a call sign does not exist in the ATC message and/or if an extracted call sign in the ATC message lacks sufficient distinctiveness such that classifying the extracted call as corresponding to a call sign in the ownship call sign list or a call sign in the traffic call sign list is difficult (no at decision 808), then the example process 800 includes marking the ATC message as unrecognized and causing the message to be displayed in a visually distinct manner that indicates that the message was unrecognized (operation 810). This may involve causing a message graphical element representative of the ATC message to be displayed in a center column of a GUI.

If a call sign does exist in the ATC message and a valid call sign can be extracted (yes at decision 808), then the example process 800 includes determining whether the extracted call sign matches with an ownship call sign (decision 812). This may involve comparing the extracted call sign with the call signs in the ownship call sign list 803. If the extracted call sign matches with an ownship call sign (yes at decision 812), then the example process 800 includes marking the ATC message as an ownship message and causing the message to be displayed in a visually distinct manner that indicates that the message was an ownship message (operation 814). This may involve causing a message graphical element representative of the ATC message to be displayed in a right column of the GUI.

If the extracted call sign does not match with an ownship call sign (no at decision 812), then the example process 800 includes marking the ATC message as a traffic aircraft message and causing the message to be displayed in a visually distinct manner that indicates that the message was a traffic aircraft message (operation 816). This may involve causing a message graphical element representative of the ATC message to be displayed in a left column of the GUI. After marking the ATC message as a traffic aircraft message (operation 816), the example process 800 includes extracting the call sign from the message and adding the extracted call sign to a traffic call sign list (operation 818). The traffic call sign list along with the ownship route and ownship call sign list 803 may be stored in a database 819.

The example process 800 includes obtaining flight crew input regarding the classification of the ATC message (operation 820). This may involve flight crew interaction with the GUI to change the visually distinct manner in which the message is displayed.

The example process 800 includes determining if a message previously classified as a traffic message or an unrecognized message has been reclassified as an ownship message (decision 822). If a message previously classified as a traffic message or an unrecognized message is reclassified as an ownship message (yes at decision 822), then the example process 800 includes extracting the call sign and updating the ownship call sign list 803 by adding the extracted call sign to the ownship call sign list 803 (operation 824).

If no at decision 822, the example process 800 includes determining if a message previously classified as an ownship message has been reclassified as a traffic message (decision 826). If a message previously classified as an ownship message has been reclassified as a traffic message (yes at decision 826), then the example process 800 includes removing the call sign for the reclassified message from ownship call sign list 803 (operation 828).

If a message previously classified as an ownship message has not been reclassified as a traffic message (no at decision 826), then the example process 800 includes extracting the call sign from the message and adding the extracted call sign to the traffic call sign list (operation 818).

Figure 9:
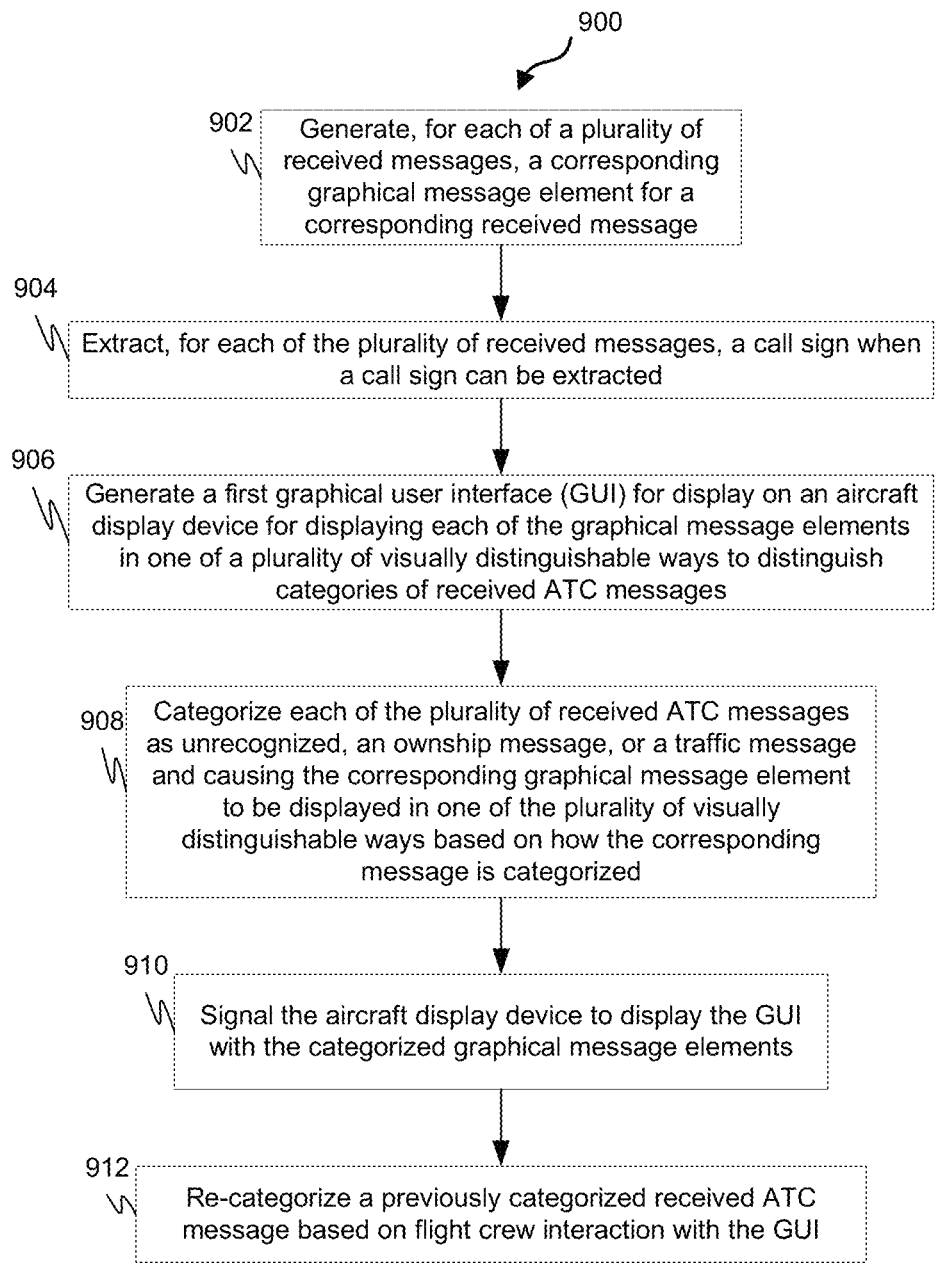
FIG. 9 is a process flow chart depicting an example process for presenting received messages for display in an aircraft, in accordance with some embodiments.

FIG. 9 is a process flow chart depicting an example process 900 for presenting received messages for display in an aircraft. The order of operation within the process 900 is not limited to the sequential execution as illustrated in the figure but may be performed in one or more varying orders as applicable and in accordance with the present disclosure.

The example process 900 includes generating, for each of a plurality of received messages, a corresponding graphical message element for a corresponding received message (operation 902), extracting, for each of the plurality of received messages, a call sign when a call sign can be extracted (operation 904), and generating a first graphical user interface (GUI) for display on an aircraft display device for displaying each of the graphical message elements in one of a plurality of visually distinguishable ways to distinguish categories of received ATC messages (operation 906)

The example process 900 includes categorizing each of the plurality of received ATC messages as unrecognized, an ownship message, or a traffic message and causing the corresponding graphical message element to be displayed in one of the plurality of visually distinguishable ways based on how the corresponding message is categorized (operation 908). Categorizing each of the plurality of received ATC messages as unrecognized, an ownship message, or a traffic message may involve one or more of: categorizing a received ATC message as unrecognized and causing the corresponding graphical message element to be displayed in a first of the plurality of visually distinguishable ways when a valid call sign cannot be extracted from the received ATC message; categorizing the received ATC message as an ownship message and causing the corresponding graphical message element to be displayed in a second of the plurality of visually distinguishable ways when the extracted call sign from the received ATC message corresponds with an ownship call sign from a plurality of ownship call signs in an ownship call sign list; categorizing the received ATC message as a traffic message and causing the corresponding graphical message element to be displayed in a third of the plurality of visually distinguishable ways when the extracted call sign from the received ATC message corresponds with a traffic call sign from a plurality of traffic call signs in a traffic call sign list; and categorizing the received ATC message as an unrecognized message and causing the corresponding graphical message element to be displayed in the first of the plurality of visually distinguishable ways when the extracted call sign does not correspond with a traffic call sign from the traffic call sign list or an ownship call sign from the ownship call sign list.

Causing the corresponding graphical message element to be displayed in one of a plurality of visually distinguishable ways may comprise causing the corresponding graphical message element to be displayed in one of a plurality of different columns (e.g., left, center, and right columns) on the GUI. Causing the corresponding graphical message element to be displayed in one of a plurality of visually distinguishable ways may comprise one or more of: causing the corresponding graphical message element to be displayed in a first (e.g., center) column of a plurality of columns on the GUI when the received ATC message is categorized as unrecognized; causing the corresponding graphical message element to be displayed in a second (e.g., right) column of a plurality of columns on the GUI when the received ATC message is categorized as an ownship message; and causing the corresponding graphical message element to be displayed in a third (e.g., left) column of a plurality of columns on the GUI when the received ATC message is categorized as a traffic message.

The example process 900 includes signaling the aircraft display device to display the GUI with the categorized graphical message elements (operation 910) and re-categorizing a previously categorized received ATC message based on flight crew interaction with the GUI (operation 912). Flight crew interaction with the GUI may comprise a swipe action by the flight crew via the aircraft display device to move the graphical message element to a different column of the GUI. Re-categorizing a previously categorized received ATC message based on flight crew interaction with the GUI may involve one or more of: re-categorizing the ATC message as an ownship message, adding the extracted call sign for the ATC message to the ownship call sign list, and causing the corresponding graphical message element to be displayed in the second of the plurality of visually distinguishable ways when the flight crew interaction with the GUI indicates categorizing the ATC message as an ownship message instead of as an unrecognized message; and re-categorizing the ATC message as an ownship message, adding the extracted call sign for the ATC message to the ownship call sign list, removing the extracted call sign for the ATC message from the traffic call sign list, and causing the corresponding graphical message element to be displayed in the second of the plurality of visually distinguishable ways when the flight crew interaction with the GUI indicates categorizing the ATC message as an ownship message instead of as a traffic message. Re-categorizing a previously categorized received ATC message based on flight crew interaction with the GUI may involve re-categorizing a previously categorized unrecognized message or traffic message as an ownship message based on flight crew interaction with the GUI and/or re-categorizing a previously categorized ownship message as a traffic message based on flight crew interaction with the GUI. Re-categorizing a previously categorized received ATC message based on flight crew interaction with the GUI may involve on or more of: re-categorizing the ATC message as a traffic message, adding the extracted call sign for the ATC message to the traffic call sign list, and causing the corresponding graphical message element to be displayed in the third of the plurality of visually distinguishable ways when the flight crew interaction with the GUI indicates categorizing the ATC message as a traffic message instead of as an unrecognized message; and/or re-categorizing the ATC message as a traffic message, adding the extracted call sign for the ATC message to the traffic call sign list, removing the extracted call sign for the ATC message from the ownship call sign list, and causing the corresponding graphical message element to be displayed in the third of the plurality of visually distinguishable ways when the flight crew interaction with the GUI indicates categorizing the ATC message as a traffic message instead of as an ownship message.

In one embodiment, a transcription system for an aircraft is provided. The transcription system comprises a controller. The controller is configured to: generate an ownship call sign list that includes a plurality of potential ownship call signs that may be used in messages from ATC directed to an ownship, the plurality of potential ownship call signs comprising one or more flight crew inputted call signs and a plurality of processor-generated call signs based on variations from flight crew inputted call sign information; add a plurality of additional processor-generated call signs to the ownship call sign list that are derived from an actual call sign used by ATC in a message directed to the ownship; and categorize a received message from ATC as being directed to the ownship when a recovered call sign from the message corresponds to a call sign from the ownship call sign list, wherein the recovered call sign corresponds to: a call sign from the plurality of processor-generated call signs based on variations from flight crew inputted call sign information, or a call sign from the plurality of additional processor-generated call signs. The controller is further configured to signal an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

These aspects and other embodiments may include one or more of the following features. The controller may be further configured to generate a traffic call sign list comprising a plurality of traffic call signs for traffic aircraft in a geographical area based on data received from an external source (e.g., ADS-B, FIS-B, and other contextual data); and to categorize the received message from ATC as being directed to the ownship, the controller may be further configured to determine that the recovered call sign does not correspond to a call sign from the plurality of traffic call signs. The controller may be further configured to: categorize the received message as a traffic message when the recovered call sign corresponds to a call sign from the plurality of traffic call signs; and signal the aircraft display device to display the graphical message element in a manner that indicates that the received message is directed to a traffic aircraft. The controller may be further configured to alert flight crew and wait for flight crew input at runtime when the recovered call sign from the received message does not correspond to a call sign from the plurality of traffic call signs or a call sign from the ownship call sign list. The controller may be further configured to add a new ownship call sign corresponding to the recovered call sign to the ownship call sign list when received flight crew input at runtime associates the recovered call sign with the ownship. The controller may be further configured to generate and add a plurality of new call sign variations at runtime to the ownship call sign list based on the new ownship call sign. The controller may be configured to generate and add the plurality of new call sign variations to the ownship call sign list based on one or more flight crew inputted call sign keywords, a tail number, a flight ID, one or more airline-specific shortened call sign variations, or a specific or special designator assigned to aircraft operators or companies or airlines. The plurality of processor-generated call signs based on variations from flight crew inputted call sign information may comprise a plurality of processor-generated call signs generated based on one or more of: one or more flight crew inputted call sign keywords, a tail number, a flight ID, one or more airline-specific shortened call sign variations, or a specific or special designator assigned to aircraft operators or companies or airlines. The one or more flight crew inputted call sign keywords may comprise on one or more of aircraft manufacturer name and brand name, special designator assigned to aircraft, and aircraft category. The controller may be further configured to parse the received message to extract the recovered call sign. The controller may be further configured to: retrieve a plurality of received messages originating from one or more entities outside of the aircraft; extract a call sign from each of the plurality of retrieved messages; generate a graphical message element associated with a retrieved message for each of the plurality of retrieved messages that includes a section for displaying an extracted call sign for an intended recipient of the associated message; and signal the aircraft display device to display the graphical message elements for each of the plurality of retrieved messages in a manner that indicates whether a retrieved message corresponding to a graphical message element is categorized as a traffic message or an ownship message.

In another embodiment, a method for a transcription system for an aircraft is provided. The method comprises: generating an ownship call sign list that includes a plurality of potential ownship call signs that may be used in messages from ATC directed to an ownship, the plurality of potential ownship call signs comprising one or more flight crew inputted call signs and a plurality of processor-generated call signs based on variations from flight crew inputted call sign information; adding a plurality of additional processor-generated call signs to the ownship call sign list that are derived from an actual call sign used by ATC in a message directed to the ownship; and categorizing a received message from ATC as being directed to the ownship when a recovered call sign from the message corresponds to a call sign from the ownship call sign list, wherein the recovered call sign corresponds to: a call sign from the plurality of processor-generated call signs based on variations from flight crew inputted call sign information, or a call sign from the plurality of additional processor-generated call signs. The method further comprises signaling an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

These aspects and other embodiments may include one or more of the following features. The method may further comprise generating a traffic call sign list comprising a plurality of traffic call signs for traffic aircraft in a geographical area based on data received from an external source (e.g., ADS-B, FIS-B, and other contextual data), and wherein categorizing the received message from ATC as being directed to the ownship comprises determining that the recovered call sign does not correspond to a call sign from the plurality of traffic call signs. The method may further comprise categorizing the received message as a traffic message when the recovered call sign corresponds to a call sign from the plurality of traffic call signs; and signaling the aircraft display device to display the graphical message element in a manner that indicates that the received message is directed to a traffic aircraft. The method may further comprise alerting flight crew and waiting for flight crew input at runtime when the recovered call sign from the received message does not correspond to a call sign from the plurality of traffic call signs or a call sign from the ownship call sign list. The method may further comprise adding a new ownship call sign corresponding to the recovered call sign to the ownship call sign list when received flight crew input at runtime associates the recovered call sign with the ownship. The method may further comprise generating and adding a plurality of new call sign variations at runtime to the ownship call sign list based on the new ownship call sign. The method may further comprise generating and adding the plurality of new call sign variations to the ownship call sign list based on one or more flight crew inputted call sign keywords, a tail number, a flight ID, one or more airline-specific shortened call sign variations, or a specific or special designator assigned to aircraft operators or companies or airlines. The plurality of processor-generated call signs based on variations from flight crew inputted call sign information may comprise a plurality of processor-generated call signs generated based on one or more of: one or more flight crew inputted call sign keywords, a tail number, a flight ID, one or more airline-specific shortened call sign variations, or a specific or special designator assigned to aircraft operators or companies or airlines. The one or more flight crew inputted call sign keywords may comprise one or more of aircraft manufacturer name and brand name, special designator assigned to aircraft, and aircraft category. The method may further comprise parsing the received message to extract the recovered call sign. The method may further comprise: retrieving a plurality of received messages originating from one or more entities outside of the aircraft; extracting a call sign from each of the plurality of retrieved messages; generating a graphical message element associated with a retrieved message for each of the plurality of retrieved messages that includes a section for displaying an extracted call sign for an intended recipient of the associated message; and signaling the aircraft display device to display the graphical message elements for each of the plurality of retrieved messages in a manner that indicates whether a retrieved message corresponding to a graphical message element is categorized as a traffic message or an ownship message In another embodiment, a non-transitory computer readable medium is provided. The non-transitory computer readable medium is encoded with instructions that when executed by a controller for a transcription system for an aircraft is configurable to cause the transcription system to perform a method. The method comprises: generating an ownship call sign list that includes a plurality of potential ownship call signs that may be used in messages from ATC directed to the ownship, the plurality of potential ownship call signs comprising one or more flight crew inputted call signs and a plurality of processor-generated call signs based on variations from flight crew inputted call sign information; adding a plurality of additional processor-generated call signs to the ownship call sign list that are derived from an actual call sign used by ATC in a message directed to the ownship; and categorizing a received message from ATC as being directed to the ownship when a recovered call sign from the message corresponds to a call sign from the ownship call sign list, wherein the recovered call sign corresponds to: a call sign from the plurality of processor-generated call signs based on variations from flight crew inputted call sign information, or a call sign from the plurality of additional processor-generated call signs. The method further comprises signaling an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

In another embodiment, a transcription system for an aircraft is provided. The transcription system comprises a controller. The controller is configured to: generate, for each of a plurality of received ATC messages, a corresponding graphical message element that includes a textual representation of message content (e.g., transcribed text or text from a CPDLC message) for a corresponding received ATC message; extract, for each of the plurality of received ATC messages, a call sign when a call sign can be extracted; generate a first graphical user interface (GUI) for display on an aircraft display device for displaying each of the graphical message elements in one of a plurality of visually distinguishable ways to distinguish categories of received ATC messages; categorize each of the plurality of received ATC messages as unrecognized, an ownship message, or a traffic message and cause the corresponding graphical message element to be displayed in one of a plurality of visually distinguishable ways based on how the corresponding message is categorized; signal the aircraft display device to display the GUI with the categorized graphical message elements; and re-categorize a previously categorized received ATC message based on flight crew interaction with the GUI.

These aspects and other embodiments may include one or more of the following features. To categorize each of the plurality of received ATC messages and to cause the corresponding graphical message element to be displayed in one of a plurality of visually distinguishable ways, the controller may be configured to: categorize a received ATC message as unrecognized and cause the corresponding graphical message element to be displayed in a first of the plurality of visually distinguishable ways when a valid call sign cannot be extracted from the received ATC message; categorize the received ATC message as an ownship message and cause the corresponding graphical message element to be displayed in a second of the plurality of visually distinguishable ways when the extracted call sign from the received ATC message corresponds with an ownship call sign from a plurality of ownship call signs in an ownship call sign list; categorize the received ATC message as a traffic message and cause the corresponding graphical message element to be displayed in a third of the plurality of visually distinguishable ways when the extracted call sign from the received ATC message corresponds with a traffic call sign from a plurality of traffic call signs in a traffic call sign list; and categorize the received ATC message as an unrecognized message and cause the corresponding graphical message element to be displayed in the first of the plurality of visually distinguishable ways when the extracted call sign does not correspond with a traffic call sign from the traffic call sign list or an ownship call sign from the ownship call sign list.

To re-categorize a previously categorized received ATC message based on flight crew interaction with the GUI, the controller may be configured to re-categorize a previously categorized unrecognized message or traffic message as an ownship message based on flight crew interaction with the GUI and re-categorize a previously categorized ownship message as a traffic message or unrecognized message based on flight crew interaction with the GUI. To re-categorize a previously categorized received ATC message based on flight crew interaction with the GUI, the controller is configured to: re-categorize the ATC message as an ownship message, add the extracted call sign for the ATC message to the ownship call sign list, and cause the corresponding graphical message element to be displayed in the second of the plurality of visually distinguishable ways when the flight crew interaction with the GUI indicates categorizing the ATC message as an ownship message instead of as an unrecognized message; and re-categorize the ATC message as an ownship message, add the extracted call sign for the ATC message to the ownship call sign list, remove the extracted call sign for the ATC message from the traffic call sign list, and cause the corresponding graphical message element to be displayed in the second of the plurality of visually distinguishable ways when the flight crew interaction with the GUI indicates categorizing the ATC message as an ownship message instead of as a traffic message. To re-categorize a previously categorized received ATC message based on flight crew interaction with the GUI, the controller may be configured to: re-categorize the ATC message as a traffic message, add the extracted call sign for the ATC message to the traffic call sign list, and cause the corresponding graphical message element to be displayed in the third of the plurality of visually distinguishable ways when the flight crew interaction with the GUI indicates categorizing the ATC message as a traffic message instead of as an unrecognized message; and re-categorize the ATC message as a traffic message, add the extracted call sign for the ATC message to the traffic call sign list, remove the extracted call sign for the ATC message from the ownship call sign list, and cause the corresponding graphical message element to be displayed in the third of the plurality of visually distinguishable ways when the flight crew interaction with the GUI indicates categorizing the ATC message as a traffic message instead of as an ownship message.

To cause the corresponding graphical message element to be displayed in one of a plurality of visually distinguishable ways the controller may be configured to cause the corresponding graphical message element to be displayed in one of a plurality of different columns (e.g., left, center, and right columns) on the GUI. To cause the corresponding graphical message element to be displayed in one of a plurality of visually distinguishable ways the controller may be configured to: cause the corresponding graphical message element to be displayed in a first (e.g., center) column of a plurality of columns on the GUI when the received ATC message is categorized as unrecognized; cause the corresponding graphical message element to be displayed in a second (e.g., right) column of a plurality of columns on the GUI when the received ATC message is categorized as an ownship message; and cause the corresponding graphical message element to be displayed in a third (e.g., left) column of a plurality of columns on the GUI when the received ATC message is categorized as a traffic message. Flight crew interaction with the GUI may comprise a swipe action by the flight crew via the aircraft display device to move the graphical message element to a different column of the GUI.

In another embodiment, a method for a transcription system for an aircraft is provided. The method comprises: generating, for each of a plurality of received ATC messages, a corresponding graphical message element that includes a textual representation of message content (e.g., transcribed text or text from a CPDLC message) for a corresponding received ATC message; extracting, for each of the plurality of received ATC messages, a call sign when a call sign can be extracted; generating a first graphical user interface (GUI) for display on an aircraft display device for displaying each of the graphical message elements in one of a plurality of visually distinguishable ways to distinguish categories of received ATC messages; categorizing each of the plurality of received ATC messages as unrecognized, an ownship message, or a traffic message and cause the corresponding graphical message element to be displayed in one of a plurality of visually distinguishable ways based on how the corresponding message is categorized; signaling the aircraft display device to display the GUI with the categorized graphical message elements; and re-categorizing a previously categorized received ATC message based on flight crew interaction with the GUI.

These aspects and other embodiments may include one or more of the following features. Categorizing each of the plurality of received ATC messages and causing the corresponding graphical message element to be displayed in one of a plurality of visually distinguishable ways may comprise: categorize a received ATC message as unrecognized and cause the corresponding graphical message element to be displayed in a first of the plurality of visually distinguishable ways when a valid call sign cannot be extracted from the received ATC message; categorize the received ATC message as an ownship message and cause the corresponding graphical message element to be displayed in a second of the plurality of visually distinguishable ways when the extracted call sign from the received ATC message corresponds with an ownship call sign from a plurality of ownship call signs in an ownship call sign list; categorize the received ATC message as a traffic message and cause the corresponding graphical message element to be displayed in a third of the plurality of visually distinguishable ways when the extracted call sign from the received ATC message corresponds with a traffic call sign from a plurality of traffic call signs in a traffic call sign list; and categorize the received ATC message as an unrecognized message and cause the corresponding graphical message element to be displayed in the first of the plurality of visually distinguishable ways when the extracted call sign does not correspond with a traffic call sign from the traffic call sign list or an ownship call sign from the ownship call sign list.

Re-categorizing a previously categorized received ATC message based on flight crew interaction with the GUI may comprise re-categorizing a previously categorized unrecognized message or traffic message as an ownship message based on flight crew interaction with the GUI and re-categorize a previously categorized ownship message as a traffic message based on flight crew interaction with the GUI. Re-categorizing a previously categorized received ATC message based on flight crew interaction with the GUI may comprise: re-categorizing the ATC message as an ownship message, adding the extracted call sign for the ATC message to the ownship call sign list, and causing the corresponding graphical message element to be displayed in the second of the plurality of visually distinguishable ways when the flight crew interaction with the GUI indicates categorizing the ATC message as an ownship message instead of as an unrecognized message; and re-categorizing the ATC message as an ownship message, adding the extracted call sign for the ATC message to the ownship call sign list, removing the extracted call sign for the ATC message from the traffic call sign list, and causing the corresponding graphical message element to be displayed in the second of the plurality of visually distinguishable ways when the flight crew interaction with the GUI indicates categorizing the ATC message as an ownship message instead of as a traffic message. Re-categorizing a previously categorized received ATC message based on flight crew interaction with the GUI may comprise: re-categorizing the ATC message as a traffic message, adding the extracted call sign for the ATC message to the traffic call sign list, and causing the corresponding graphical message element to be displayed in the third of the plurality of visually distinguishable ways when the flight crew interaction with the GUI indicates categorizing the ATC message as a traffic message instead of as an unrecognized message; and re-categorizing the ATC message as a traffic message, adding the extracted call sign for the ATC message to the traffic call sign list, removing the extracted call sign for the ATC message from the ownship call sign list, and causing the corresponding graphical message element to be displayed in the third of the plurality of visually distinguishable ways when the flight crew interaction with the GUI indicates categorizing the ATC message as a traffic message instead of as an ownship message.

Causing the corresponding graphical message element to be displayed in one of a plurality of visually distinguishable ways may comprise causing the corresponding graphical message element to be displayed in one of a plurality of different columns (e.g., left, center, and right columns) on the GUI. Causing the corresponding graphical message element to be displayed in one of a plurality of visually distinguishable ways may comprise: causing the corresponding graphical message element to be displayed in a first (e.g., center) column of a plurality of columns on the GUI when the received ATC message is categorized as unrecognized; causing the corresponding graphical message element to be displayed in a second (e.g., right) column of a plurality of columns on the GUI when the received ATC message is categorized as an ownship message; and causing the corresponding graphical message element to be displayed in a third (e.g., left) column of a plurality of columns on the GUI when the received ATC message is categorized as a traffic message. Flight crew interaction with the GUI may comprise a swipe action by the flight crew via the aircraft display device to move the graphical message element to a different column of the GUI.

In another embodiment, a non-transitory computer readable medium is provided. The non-transitory computer readable medium is encoded with instructions that when executed by a controller for a transcription system for an aircraft is configurable to cause the transcription system to perform a method. The method comprises: generating, for each of a plurality of received ATC messages, a corresponding graphical message element that includes a textual representation of message content (e.g., transcribed text or text from a CPDLC message) for a corresponding received ATC message; extracting, for each of the plurality of received ATC messages, a call sign when a call sign can be extracted; generating a first graphical user interface (GUI) for display on an aircraft display device for displaying each of the graphical message elements in one of a plurality of visually distinguishable ways to distinguish categories of received ATC messages; categorizing each of the plurality of received ATC messages as unrecognized, an ownship message, or a traffic message and cause the corresponding graphical message element to be displayed in one of a plurality of visually distinguishable ways based on how the corresponding message is categorized; signaling the aircraft display device to display the GUI with the categorized graphical message elements; and re-categorizing a previously categorized received ATC message based on flight crew interaction with the GUI.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A transcription system for an aircraft, the transcription system comprising a controller, the controller configured to:
    generate an ownship call sign list that includes a plurality of potential ownship call signs that may be used in messages from ATC directed to an ownship, the plurality of potential ownship call signs comprising one or more flight crew inputted call signs and a plurality of processor-generated call signs based on variations from flight crew inputted call sign information;
    add a plurality of additional processor-generated call signs to the ownship call sign list that are derived from an actual call sign used by ATC in a message directed to the ownship;
    categorize a received message from ATC as being directed to the ownship when a recovered call sign from the message corresponds to a call sign from the ownship call sign list, wherein the recovered call sign corresponds to:
        a call sign from the plurality of processor-generated call signs based on variations from flight crew inputted call sign information; or
        a call sign from the plurality of additional processor-generated call signs;
    alert flight crew and wait for flight crew input at runtime when the recovered call sign from the received message does not correspond to a call sign from the plurality of traffic call signs or a call sign from the ownship call sign list; and
    signal an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

2. The transcription system of claim 1, wherein:
    the controller is further configured to generate a traffic call sign list comprising a plurality of traffic call signs for traffic aircraft in a geographical area based on data received from an external source; and
    to categorize the received message from ATC as being directed to the ownship, the controller is further configured to determine that the recovered call sign does not correspond to a call sign from the plurality of traffic call signs.

3. The transcription system of claim 2, wherein the controller is further configured to:
    categorize the received message as a traffic message when the recovered call sign corresponds to a call sign from the plurality of traffic call signs; and
    signal the aircraft display device to display the graphical message element in a manner that indicates that the received message is directed to a traffic aircraft.

4. The transcription system of claim 1, wherein the controller is further configured to add a new ownship call sign corresponding to the recovered call sign to the ownship call sign list when received flight crew input at runtime associates the recovered call sign with the ownship.

5. The transcription system of claim 4, wherein the controller is further configured to generate and add a plurality of new call sign variations at runtime to the ownship call sign list based on the new ownship call sign.

6. The transcription system of claim 5, wherein the controller is configured to generate and add the plurality of new call sign variations to the ownship call sign list based on one or more flight crew inputted call sign keywords, a tail number, a flight ID, one or more airline-specific shortened call sign variations, or a specific or special designator assigned to aircraft operators or companies or airlines.

7. The transcription system of claim 1, wherein the plurality of processor-generated call signs based on variations from flight crew inputted call sign information comprises a plurality of processor-generated call signs generated based on one or more of:
    one or more flight crew inputted call sign keywords, a tail number, a flight ID, one or more airline-specific shortened call sign variations, or a specific or special designator assigned to aircraft operators or companies or airlines.

8. The transcription system of claim 7, wherein the one or more flight crew inputted call sign keywords comprise one or more of aircraft manufacturer name and brand name, special designator assigned to aircraft, and aircraft category.

9. The transcription system of claim 1, wherein the controller is further configured to parse the received message to extract the recovered call sign.

10. The transcription system of claim 1, wherein the controller is further configured to:
    retrieve a plurality of received messages originating from one or more entities outside of the aircraft;
    extract a call sign from each of the plurality of retrieved messages;
    generate a graphical message element associated with a retrieved message for each of the plurality of retrieved messages that includes a section for displaying an extracted call sign for an intended recipient of the associated message; and signal the aircraft display device to display the graphical message elements for each of the plurality of retrieved messages in a manner that indicates whether a retrieved message corresponding to a graphical message element is categorized as a traffic message or an ownship message.

11. A method for a transcription system for an aircraft, the method comprising:
generating an ownship call sign list that includes a plurality of potential ownship call signs that may be used in messages from ATC directed to an ownship, the plurality of potential ownship call signs comprising one or more flight crew inputted call signs and a plurality of processor-generated call signs based on variations from flight crew inputted call sign information;
adding a plurality of additional processor-generated call signs to the ownship call sign list that are derived from an actual call sign used by ATC in a message directed to the ownship;
categorizing a received message from ATC as being directed to the ownship when a recovered call sign from the message corresponds to a call sign from the ownship call sign list, wherein the recovered call sign corresponds to:
a call sign from the plurality of processor-generated call signs based on variations from flight crew inputted call sign information; or
a call sign from the plurality of additional processor-generated call signs;
alerting flight crew and waiting for flight crew input at runtime when the recovered call sign from the received message does not correspond to a call sign from the plurality of traffic call signs or a call sign from the ownship call sign list; and
signaling an aircraft display device to display a graphical message element that is representative of the received message, includes a textual representation of message content and the recovered call sign from the received message, and that is displayed in a manner that indicates whether the received message has been categorized as being directed to the ownship or a traffic aircraft.

12. A transcription system for an aircraft, the transcription system comprising a controller, the controller configured to:
generate, for each of a plurality of received ATC messages, a corresponding graphical message element that includes a textual representation of message content for a corresponding received ATC message;
extract, for each of the plurality of received ATC messages, a call sign when a call sign can be extracted;
generate a first graphical user interface (GUI) for display on an aircraft display device for displaying each of the graphical message elements in one of a plurality of visually distinguishable ways to distinguish categories of received ATC messages;
categorize each of the plurality of received ATC messages as unrecognized, an ownship message, or a traffic message and cause the corresponding graphical message element to be displayed in one of a plurality of visually distinguishable ways based on how the corresponding message is categorized;
signal the aircraft display device to display the GUI with the categorized graphical message elements; and
re-categorize a previously categorized received ATC message based on flight crew interaction with the GUI.

13. The transcription system of claim 12, wherein to categorize each of the plurality of received ATC messages and to cause the corresponding graphical message element to be displayed in one of a plurality of visually distinguishable ways, the controller is configured to:
categorize a received ATC message as unrecognized and cause the corresponding graphical message element to be displayed in a first of the plurality of visually distinguishable ways when a valid call sign cannot be extracted from the received ATC message;
categorize the received ATC message as an ownship message and cause the corresponding graphical message element to be displayed in a second of the plurality of visually distinguishable ways when the extracted call sign from the received ATC message corresponds with an ownship call sign from a plurality of ownship call signs in an ownship call sign list;
categorize the received ATC message as a traffic message and cause the corresponding graphical message element to be displayed in a third of the plurality of visually distinguishable ways when the extracted call sign from the received ATC message corresponds with a traffic call sign from a plurality of traffic call signs in a traffic call sign list; and
categorize the received ATC message as an unrecognized message and cause the corresponding graphical message element to be displayed in the first of the plurality of visually distinguishable ways when the extracted call sign does not correspond with a traffic call sign from the traffic call sign list or an ownship call sign from the ownship call sign list.

14. The transcription system of claim 12, wherein to re-categorize a previously categorized received ATC message based on flight crew interaction with the GUI, the controller is configured to re-categorize a previously categorized unrecognized message or traffic message as an ownship message based on flight crew interaction with the GUI and re-categorize a previously categorized ownship message as a traffic message or unrecognized message based on flight crew interaction with the GUI.

15. The transcription system of claim 14, wherein to re-categorize a previously categorized received ATC message based on flight crew interaction with the GUI, the controller is configured to:
re-categorize the ATC message as an ownship message, add the extracted call sign for the ATC message to an ownship call sign list, and cause the corresponding graphical message element to be displayed in a second of the plurality of visually distinguishable ways when the flight crew interaction with the GUI indicates categorizing the ATC message as an ownship message instead of as an unrecognized message; and
re-categorize the ATC message as an ownship message, add the extracted call sign for the ATC message to the ownship call sign list, remove the extracted call sign for the ATC message from a traffic call sign list, and cause the corresponding graphical message element to be displayed in the second of the plurality of visually distinguishable ways when the flight crew interaction with the GUI indicates categorizing the ATC message as an ownship message instead of as a traffic message.

16. The transcription system of claim 15, wherein to re-categorize a previously categorized received ATC message based on flight crew interaction with the GUI, the controller is configured to:
re-categorize the ATC message as a traffic message, add the extracted call sign for the ATC message to the traffic call sign list, and cause the corresponding graphical message element to be displayed in a third of the plurality of visually distinguishable ways when the flight crew interaction with the GUI indicates categorizing the ATC message as a traffic message instead of as an unrecognized message; and re-categorize the ATC message as a traffic message, add the extracted call sign for the ATC message to the traffic call sign list, remove the extracted call sign for the ATC message from the ownship call sign list, and cause the corresponding graphical message element to be displayed in the third of the plurality of visually distinguishable ways when the flight crew interaction with the GUI indicates categorizing the ATC message as a traffic message instead of as an ownship message.

17. The transcription system of claim 12, wherein to cause the corresponding graphical message element to be displayed in one of a plurality of visually distinguishable ways the controller is configured to cause the corresponding graphical message element to be displayed in one of a plurality of different columns on the GUI.

18. The transcription system of claim 17, wherein to cause the corresponding graphical message element to be displayed in one of a plurality of visually distinguishable ways the controller is configured to:

cause the corresponding graphical message element to be displayed in a first column of a plurality of columns on the GUI when the received ATC message is categorized as unrecognized;

cause the corresponding graphical message element to be displayed in a second column of a plurality of columns on the GUI when the received ATC message is categorized as an ownship message; and cause the corresponding graphical message element to be displayed in a third column of a plurality of columns on the GUI when the received ATC message is categorized as a traffic message.

19. The transcription system of claim 18, wherein flight crew interaction with the GUI comprises swipe action by the flight crew via the aircraft display device to move the graphical message element to a different column of the GUI.

20. The method of claim 11, further comprising:

adding a new ownship call sign corresponding to the recovered call sign to the ownship call sign list when received flight crew input at runtime associates the recovered call sign with the ownship; and generating and adding a plurality of new call sign variations at runtime to the ownship call sign list based on the new ownship call sign.

* * * * *